United States Patent
Kawarai et al.

(10) Patent No.: US 7,737,380 B2
(45) Date of Patent: Jun. 15, 2010

(54) ELECTRICAL-DISCHARGE MACHINING APPARATUS AND METHOD AND APPARATUS FOR DIELECTRIC-FLUID QUALITY CONTROL

(75) Inventors: Hisakatsu Kawarai, Chiyoda-ku (JP); Seiji Sato, Chiyoda-ku (JP); Syuichiro Ishihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 659 days.

(21) Appl. No.: 11/665,610

(22) PCT Filed: May 23, 2005

(86) PCT No.: PCT/JP2005/009363

§ 371 (c)(1),
(2), (4) Date: Apr. 18, 2007

(87) PCT Pub. No.: WO2006/126248

PCT Pub. Date: Nov. 30, 2006

(65) Prior Publication Data

US 2007/0289925 A1  Dec. 20, 2007

(51) Int. Cl.
*B23H 1/08* (2006.01)
*C02F 1/42* (2006.01)

(52) U.S. Cl. .............. 219/69.14; 210/686; 210/900
(58) Field of Classification Search ............ 219/69.14; 210/686, 900
See application file for complete search history.

(56) References Cited

U.S. PATENT DOCUMENTS

| 4,584,450 A | 4/1986 | Inoue |
| 4,917,806 A * | 4/1990 | Matsunaga et al. .......... 210/662 |
| 5,464,959 A * | 11/1995 | Takahashi ................ 219/69.14 |

FOREIGN PATENT DOCUMENTS

| DE | 28 51 482 A1 | 5/1979 |
| EP | 0 325 046 A1 | 7/1989 |
| JP | 61-25724 A | 2/1986 |
| JP | 62-74528 A | 4/1987 |
| JP | 63-191514 A | 8/1988 |
| JP | 1-164489 A | 6/1989 |
| JP | 4-141319 A | 5/1992 |
| JP | 5-42414 A | 2/1993 |
| JP | 7-145491 A | 6/1995 |
| JP | 2002-301624 A | 10/2002 |
| JP | 2004-291206 A | 10/2004 |

* cited by examiner

*Primary Examiner*—Chester T Barry
(74) *Attorney, Agent, or Firm*—Sughrue Mion, PLLC

(57) ABSTRACT

A water purifying unit generates pure water by eliminating impurity ions from dielectric fluid. A corrosion-protection-ion generating unit generates corrosion protection ions, substitutes predetermined cations for impurity cations contained in the dielectric fluid, and substitutes the corrosion protection ions for impurity anions contained in the dielectric fluid. A switching unit switches a supply of the dielectric fluid between the water purifying unit and the corrosion-protection-ion generating unit. A switching control unit controls the switching unit based on a conductivity of the dielectric fluid measured by a conductivity measuring unit.

14 Claims, 8 Drawing Sheets

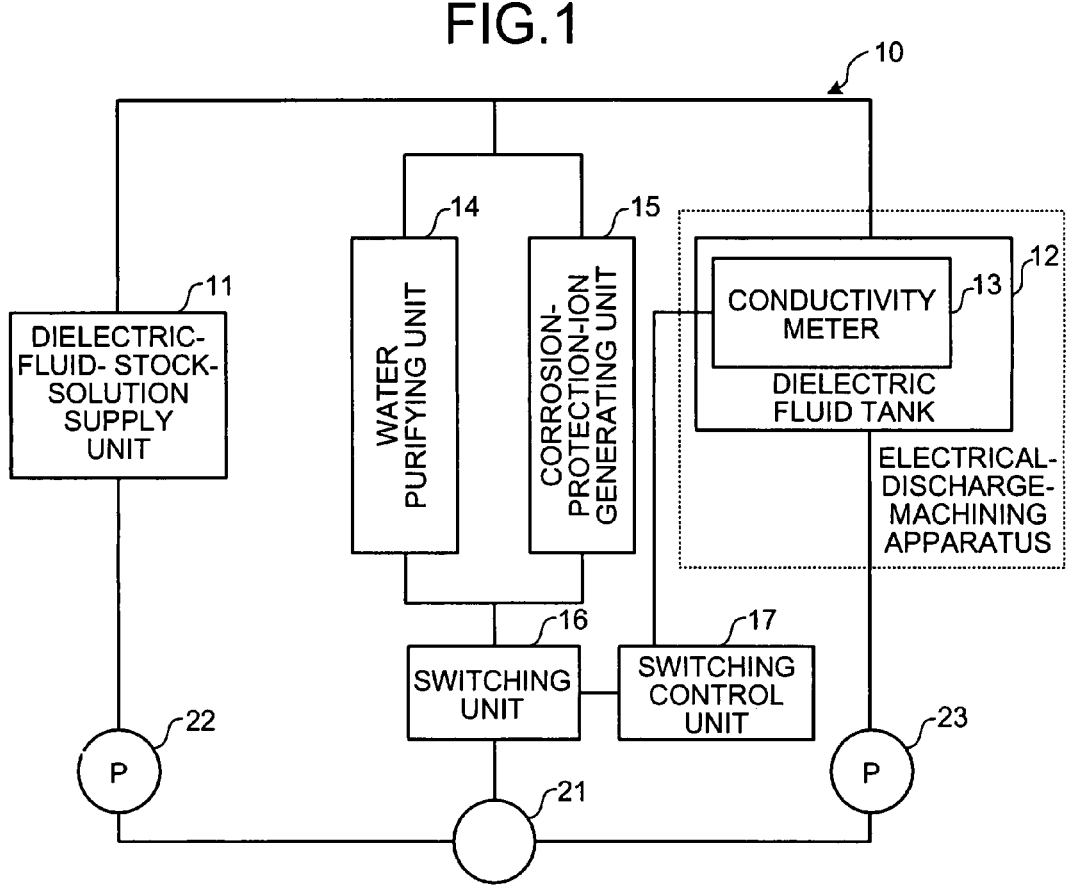
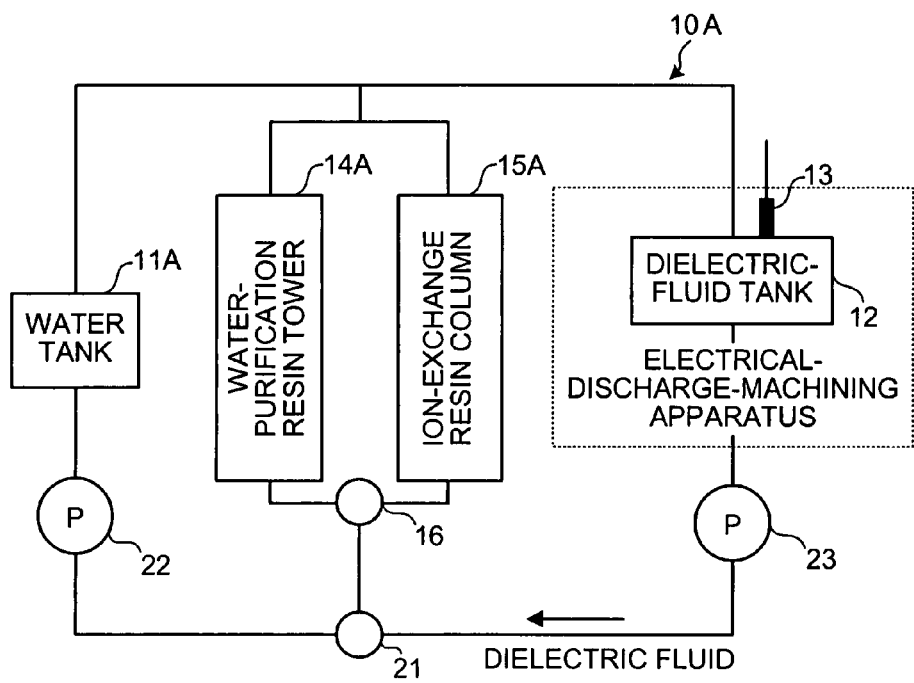

| MEASUREMENT VALUE OF CONDUCTIVITY METER | WATER-PURIFICATION RESIN PUMP | CORROSION-PROTECTION RESIN PUMP |
|---|---|---|
| HIGHER THAN SET VALUE | ACTIVATE | STOP |
| LOWER THAN SET VALUE | STOP | ACTIVATE |

FIG.9

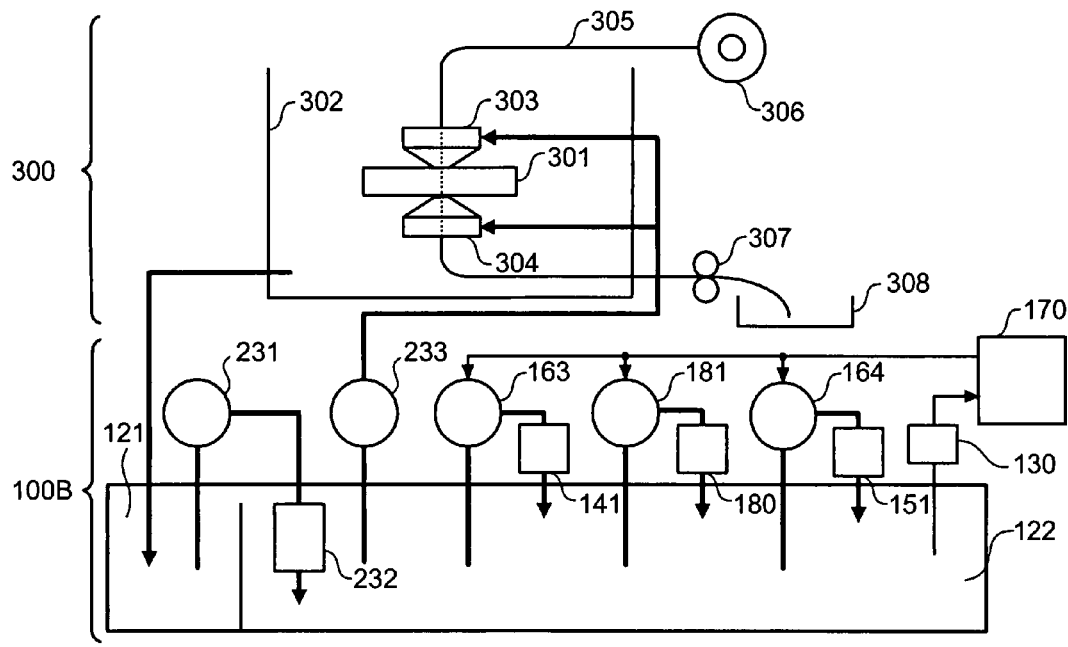

FIG.10

| DURING MACHINING TIME/DURING NON-MACHINING TIME | MEASUREMENT VALUE OF CONDUCTIVITY METER | H⁺-FORM-CATION-EXCHANGE RESIN PUMP | OH⁻-FORM-ANION-EXCHANGE RESIN PUMP | Na⁺-FORM-CATION-EXCHANGE RESIN PUMP |
|---|---|---|---|---|
| DURING MACHINING TIME/DURING NON-MACHINING TIME | HIGHER THAN SET VALUE | ACTIVATE | ACTIVATE | STOP |
| DURING MACHINING TIME | LOWER THAN SET VALUE | STOP | ACTIVATE | ACTIVATE |
| DURING NON-MACHINING TIME | LOWER THAN SET VALUE | STOP | ACTIVATE | STOP |

FIG.14

| DURING MACHINING TIME/DURING NON-MACHINING TIME | MEASUREMENT VALUE OF CONDUCTIVITY METER | WATER-PURIFICATION RESIN PUMP | CORROSION-PROTECTION RESIN PUMP | ELECTROLYZED-WATER PUMP |
|---|---|---|---|---|
| DURING MACHINING TIME/DURING NON-MACHINING TIME | HIGHER THAN SET VALUE | ACTIVATE | STOP | STOP |
| DURING MACHINING TIME | LOWER THAN SET VALUE | STOP | ACTIVATE | ACTIVATE |
| DURING NON-MACHINING TIME | LOWER THAN SET VALUE | STOP | STOP | ACTIVATE |

FIG.15

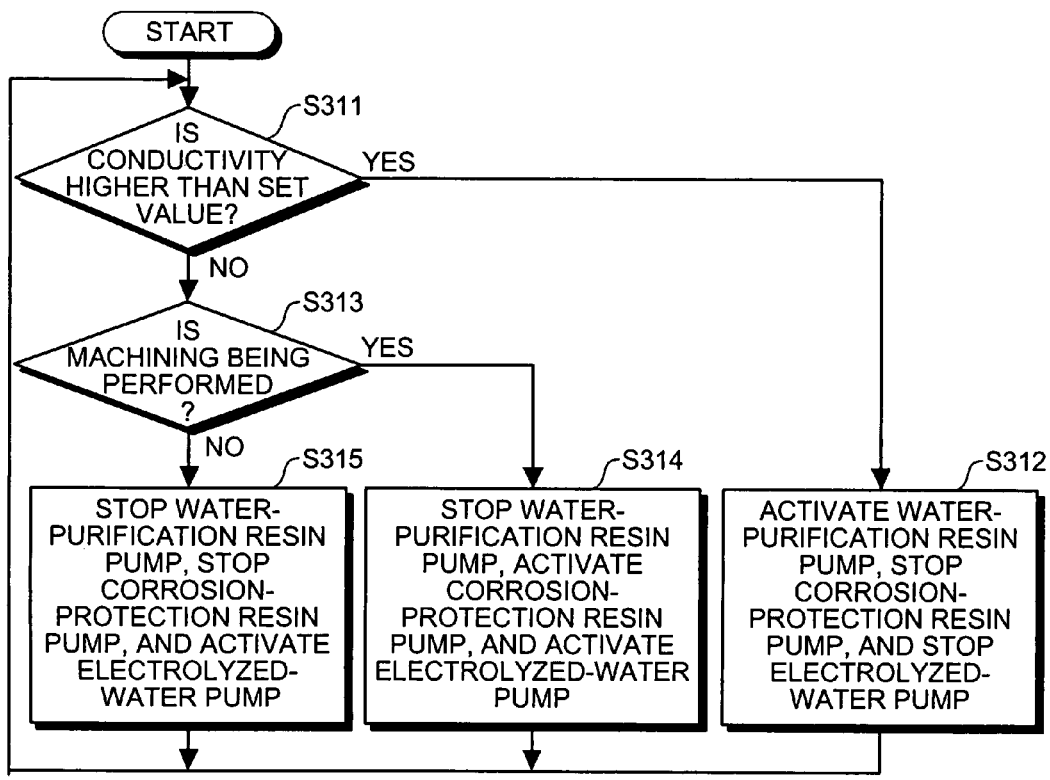

ELECTRICAL-DISCHARGE MACHINING APPARATUS AND METHOD AND APPARATUS FOR DIELECTRIC-FLUID QUALITY CONTROL

TECHNICAL FIELD

The present invention relates to a dielectric-fluid quality control apparatus and a dielectric-fluid quality control method for controlling conductivity and a pH of ion exchange water used as a dielectric fluid in an electrical-discharge-machining process, and relates to an electrical-discharge machining apparatus that includes the dielectric-fluid quality control apparatus.

BACKGROUND ART

In an electrical-discharge-machining process for machining a workpiece by applying a pulsed voltage between the workpiece and an electrode through a dielectric fluid to generate discharge, it is necessary to control conductivity (specific resistance) of the dielectric fluid to fall within a predetermined range to make it easier to generate discharge under stable conditions. In addition, to prevent the workpiece from being dissolved because of a change in a hydrogen ion concentration (or hydroxyl ion concentration) of the dielectric fluid as a result of control over the conductivity of the dielectric fluid, it is necessary to control a pH of the dielectric fluid to fall within a predetermined range determined according to a quality of a material for the workpiece. There has been conventionally proposed a technique for measuring the conductivity and the pH of the workpiece used in the electrical-discharge-machining process by a conductivity meter and a pH meter, respectively, and for controlling the fluid quality of the dielectric fluid based on measurement results (see, for example, Patent Documents 1 to 3).

Furthermore, in the electrical-discharge-machining process, if the workpiece is immersed into the dielectric fluid for a long time, metal that constitutes the workpiece is corroded. To prevent the metal corrosion, a corrosion inhibitor is sometimes added to the fluid. However, when a concentration of the corrosion inhibitor increases, then the conductivity of the dielectric fluid increases and stable discharge cannot be performed. To prevent this disadvantage, there has been conventionally proposed an iron-based metal corrosion protecting method capable of protecting an iron-based metal in water from corrosion using an anion exchange resin in which one or more types of ions from among nitride ions and carbonate ions, hydrogen carbonate ions, and hydroxyl ions are fixed, and ensuring stable discharge (see, for example, Patent Document 4). In addition, there has been conventionally proposed a corrosion protecting method for protecting a cemented carbide or a metal in water from corrosion by adding a water-soluble metal anticorrosive to the water although the method is not applied to the electrical-discharge-machining process (see, for example, Patent Document 5).

Patent Document 1: Japanese Patent Application Laid-Open No. S63-191514
Patent Document 2: Japanese Patent Application Laid-Open No. H4-141319
Patent Document 3: Japanese Patent Application Laid-Open No. H5-42414
Patent Document 4: Japanese Patent Application Laid-Open No. 2000-301624
Patent Document 5: Japanese Patent Application Laid-Open No. H7-145491

DISCLOSURE OF INVENTION

Problem to be Solved by the Invention

According to the conventional technologies disclosed in Patent Literatures 1 to 3, the pH meter is used to measure the pH of the dielectric fluid in the electrical-discharge-machining process as already stated. Normally, the pH meter employs a glass electrode. If the pH meter is immersed in the dielectric fluid for a long time, an internal fluid of the pH meter is contaminated. Accordingly, it becomes disadvantageously necessary to perform a periodic maintenance of the glass electrode.

According to the conventional technology disclosed in Patent Literature 4, if the anion exchange resin in which one or more types of ions from among nitride ions and carbonate ions, hydrogen carbonate ions, and hydroxyl ions are fixed is used as the corrosion inhibitor for the dielectric fluid, the resin is effective to protect a passivated metal such as iron from corrosion. However, the resin is ineffective to protect a non-passivated metal such as a cemented carbide or Cu (copper) from corrosion.

Furthermore, as stated above, it is necessary to control the conductivity of the dielectric fluid in the electrical-discharge-machining process to fall within the predetermined conductivity so as not to deteriorate discharge machining performance. Therefore, a water purification resin (($H^+$-form-cation-exchange resin)+($OH^-$-form-anion-exchange resin)) is added to the dielectric fluid. However, if the water-soluble metal anticorrosive is added to the dielectric fluid in the electrical-discharge-machining process, ionic substances in the water-soluble metal anticorrosive are captured by the water purification resin. Accordingly, a concentration of the water-soluble metal anticorrosive decreases in the dielectric fluid and the water-soluble metal anticorrosive cannot produce a corrosion protection effect on the cemented carbide or the metal.

The present invention has been achieved in view of the conventional disadvantages. It is an object of the present invention to provide a dielectric-fluid quality control apparatus and a dielectric-fluid quality control method capable of measuring a pH of ion exchange water serving as a dielectric fluid used in an electrical-discharge-machining process without using a pH meter, stably performing the electrical-discharge-machining process, and controlling a conductivity and the pH of the ion exchange water to produce a corrosion protection effect on a workpiece. It is another object of the invention to provide an electrical-discharge machining apparatus that includes the dielectric-fluid quality control apparatus.

Means for Solving Problem

To achieve the above object, a dielectric-fluid quality control apparatus according to the present invention includes: a dielectric-fluid tank that stores a dielectric fluid; a water purification unit that generates pure water by eliminating impurity ions from the dielectric fluid in the dielectric-fluid tank so that the dielectric fluid contains a predetermined amount of impurity ions; a corrosion-protection-ion generating unit that substitutes predetermined cations for impurity cations in the dielectric fluid stored in the dielectric-fluid tank, and that substitutes corrosion protection ions for impurity anions in the dielectric fluid stored in the dielectric-fluid tank; a switching unit that switches over a supply destination of the dielectric fluid in the dielectric-fluid tank between the water purification unit and the corrosion-protection-ion generating unit, and that supplies the dielectric fluid to one of the water purification unit and the corrosion-protection-ion generating unit; a conductivity measuring unit that measures a conductivity of the dielectric fluid in the dielectric-fluid tank; and a switching control unit that controls the switching unit to supply the dielectric fluid to one of the water purification unit and the corrosion-protection-ion generating unit based on the conductivity measured by the conductivity measuring unit.

Effect of the Invention

According to the present invention, by using the water-soluble alkaline fluid as the dielectric fluid, the pH of the dielectric fluid can be advantageously obtained from the conductivity of the dielectric fluid without using the pH meter. In addition, the workpiece such as the cemented carbide or the metal can be advantageously protected from corrosion.

BRIEF DESCRIPTION OF DRAWINGS

FIG. 1 is a schematic diagram of a configuration of a dielectric-fluid quality control apparatus according to a first embodiment of the present invention;

FIG. 2 is a schematic diagram of a configuration of a dielectric-fluid quality control apparatus according to a second embodiment of the present invention;

FIG. 9 is a schematic diagram of a configuration example of an electrical-discharge machining apparatus that includes the dielectric-fluid quality control apparatus shown in FIG. 8;

FIG. 10 depicts a control operation performed by a switching control unit;

FIG. 14 depicts a control operation performed by a switching control unit; and

FIG. 15 is a flowchart of a switching process performed by the switching control unit.

Figure 3:
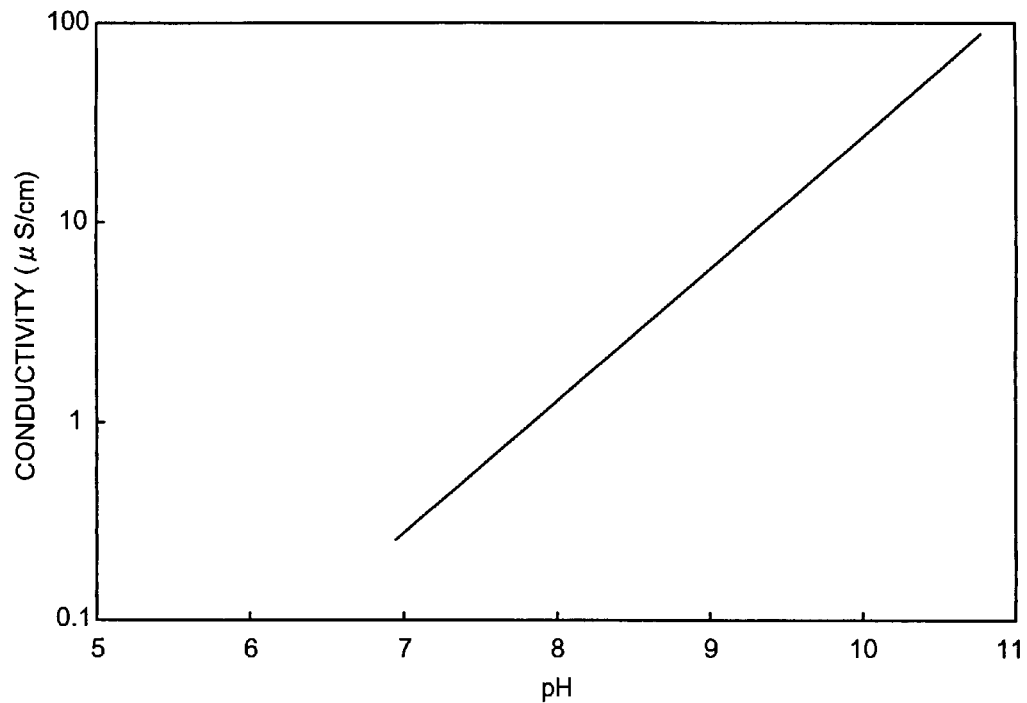
FIG. 3 is a chart that depicts the relationship between conductivity and pH of a NaOH aqueous solution.

EXPLANATIONS OF LETTERS OR NUMERALS 10, 10A to 10C Dielectric-fluid quality control apparatus
11 Dielectric-fluid-stock-solution supply unit
11A Water tank
12 Dielectric-fluid tank
13 Conductivity meter
14 Water purification unit
14A, 140 Water-purification resin column
14B, 141 $H^+$-form-cation-exchange resin column
15 Corrosion-protection-ion generating unit
15A Ion-exchange resin column
15B, 151 $Na^+$-form-cation-exchange resin column
15C, 152 Electrolyzed-water generating unit
16 Switching unit
16A to 16E, 21 Valve
17, 170 Switching control unit
18, 180 $OH^-$-form-anion-exchange resin column
19 Acidic-water storage container
22, 23 Pump
100A to 100C Dielectric-fluid quality control unit
121 Waste-fluid tank
122 Clean-fluid tank
130 Conductivity meter
150 Corrosion-protection resin column
161 Water-purification resin pump
162 Corrosion-protection resin pump
163 $H^+$-form-cation-exchange resin pump
164 $Na^+$-form-cation-exchange resin pump
181 $OH^-$-form-anion-exchange resin pump
231 Filter pump
232 Filter
233 Dielectric-fluid pump
300 Electric-discharge-machining unit

BEST MODE(S) FOR CARRYING OUT THE INVENTION

Exemplary embodiments of a dielectric-fluid quality control apparatus, a method therefore, and an electrical-discharge machining apparatus according to the present invention will be explained below in detail with reference to the accompanying drawings.

First Embodiment

Generally, an electrical-discharge-machining process is performed by immersing a cemented carbide such a WC—Co or a metal such as Cu in a dielectric fluid. Reactions provoked when the cemented carbide and the metal are immersed in neutral water, respectively will be explained first. If a workpiece is the WC—Co that is the cemented carbide, Co in the WC—Co is corroded in the neutral water as expressed by the following formula (1) and water-dissolved oxygen is reduced by electrons generated in a reaction represented by the formula (1), as expressed by the following formula (2). As a result, as expressed by the following formula (3) deriving from the formulas (1) and (2), Co which is a binder phase is selectively corroded by the water-dissolved oxygen. The selective Co corrosion generates a void layer accompanying the Co corrosion on a surface of the cemented carbide (WC—Co).

$$Co \rightarrow Co^{2+} + 2e \quad (1)$$

$$\tfrac{1}{2}O_2 + H_2O + 2e \rightarrow 2OH^- \quad (2)$$

$$Co + \tfrac{1}{2}O_2 + H_2O \rightarrow Co^{2+} + 2OH^- \quad (3)$$

Similarly to the cemented carbide, the corrosion reaction that occurs to the metal progresses in the neutral water. The corrosion reaction in the water is expressed by the following formulas (4) to (6).

$$Cu \rightarrow Cu^{2+} + 2e \quad (4)$$

$$\tfrac{1}{2}O_2 + H_2O + 2e \rightarrow 2OH^- \quad (5)$$

$$Cu + \tfrac{1}{2}O_2 + H_2O \rightarrow Cu^{2+} + 2OH^- \quad (6)$$

If the workpiece is the metal, then Cu is corroded as expressed by the formula (4), and water-dissolved oxygen is reduced by electrons generated in a reaction represented by the formula (5). As a result, as expressed by the formula (6), the Cu corrosion is accelerated by the water-dissolved oxygen. In the formulas (4) to (6), Cu is used as the metal. However, the same corrosion reaction occurs to other metals.

As explained above, the corrosion of the cemented carbide such as WC—Co or the metal such as Cu in the neutral water is caused by the dissolved oxygen. With reference to the formulas (3) and (6), it is clear that if the pH of the dielectric fluid is controlled to have an alkaline pH in the dielectric fluid (water) in which dissolved oxygen is present, that is, if the concentration of hydroxyl ions is controlled to be increased, the cemented carbide or the metal can be protected from corrosion. Various experiments show that a lower limit pH is preferably 8.5 to produce the corrosion protection effect on the cemented carbide such as WC—Co or on the metal such as Cu, Fe, or Zn. In addition, if the pH of the dielectric fluid rises, the conductivity thereof rises and the electrical discharge machining performance is deteriorated. An upper limit pH is, therefore, preferably 10.5.

Furthermore, to maintain stable discharge machining performance in the electrical-discharge-machining process, the conductivity of the dielectric fluid is preferably set to a predetermined conductivity (normally equal to or lower than 70 μS/cm). To obtain the pH of the dielectric fluid without using a pH meter, pure water containing a predetermined amount of impurity (ion exchange water) is used as the dielectric fluid, and the impurity is substituted for ions constituting a basic aqueous solution. Specifically, cations of the impurity are substituted for cations of, for example, alkaline metal or alkaline-earth metal, and anions thereof are substituted for hydroxyl ions (OH⁻). Therefore, an amount of anions contained in the pure water corresponds to an amount by which the anions are substituted for the hydroxyl ions. The conductivity of the dielectric fluid based on which it is determined whether the amount of anions is large or small, therefore, corresponds to the concentration of the hydroxyl ions, i.e., the pH of the dielectric fluid. In other words, by measuring the conductivity of the dielectric fluid (ion exchange water) turned into the alkaline aqueous solution, the pH of the dielectric fluid can be obtained. The measured conductivity is compared with a conductivity at which the pH of the dielectric fluid falls within a predetermined range. By controlling the amount of hydroxyl ions contained in the dielectric fluid based on the comparison result, it is possible to maintain protecting the workpiece from corrosion without deteriorating the electrical discharge machining performance. As a result, the pH can be obtained by measuring conductivity, without using the pH meter including a glass electrode.

A dielectric-fluid quality control apparatus for realizing a control over the quality of such a dielectric fluid will next be explained. FIG. 1 is a schematic diagram of a configuration of the dielectric-fluid quality control apparatus according to a first embodiment of the present invention. A dielectric-fluid quality control apparatus 10 includes a dielectric-fluid-stock-solution supply unit 11, a dielectric-fluid tank 12, a conductivity meter 13, a water purification unit 14, a corrosion-protection-ion generating unit 15, a switching unit 16, and a switching control unit 17.

The dielectric-fluid-stock-solution supply unit 11 supplies a dielectric fluid stock that serves as a source of the dielectric fluid. Specifically, the dielectric-fluid-stock-solution supply unit 11 supplies freshwater such as running water, industrial water, or ground water. The dielectric-fluid tank 12 is a tank that stores the dielectric fluid used in the electrical-discharge-machining process of the electrical-discharge machining apparatus. The conductivity meter 13 measures the conductivity of the dielectric fluid in the dielectric-fluid tank 12.

The water purification unit 14 eliminates impurity ions contained in the freshwater supplied from the dielectric-fluid-stock-solution supply unit 11 or in the dielectric fluid supplied from the dielectric-fluid tank 12, and generates ion exchange water (hereinafter, also referred to as "pure water"). It is noted, however, that the water purification unit 14 does not completely eliminate the impurity but leaves a trace of impurity ions so that the conductivity of the dielectric fluid is equal to several to several tens of μS/cm. The impurity ions are substituted for cations of alkaline metal or alkaline-earth metal, and anions of hydroxyl ions, which are corrosion protection ions generated by the corrosion-protection-ion generating unit 15 to be explained later. It is thus possible to obtain the pH of the ion exchange water based on the concentration of the impurity ions. As the water purification unit 14, a mixture or a combination of an H⁺-form-cation-exchange resin and an OH⁻-form-anion-exchange resin can be employed.

The corrosion-protection-ion generating unit 15 generates the hydroxyl ions acting as the corrosion protection ions, and substitutes the corrosion protection ions for the impurity ions in the ion exchange water (or dielectric fluid). The impurity ion-containing ion exchange water in which the corrosion protection ions have been substituted for the impurity ions will be hereinafter referred to as "dielectric fluid". As the corrosion-protection-ion generating unit 15, a mixture or a combination of an alkaline metal ion form or alkaline-earth metal ion-form-cation-exchange resin and an OH⁻-form-anion-exchange resin, or a combination of an electrolyzed water generating apparatus therewith can be employed.

The switching unit 16 switches over supply destination of the dielectric fluid stock from the dielectric-fluid-stock-solution supply unit 11 or supply of the dielectric fluid from the dielectric-fluid tank 12 between the water purification unit 14 and the corrosion-protection-ion generating unit 15. The switching unit 16 is configured by a valve or the like.

The switching control unit 17 acquires conductivity-pH information indicating the relationship between the conductivity and the pH (concentration of the hydroxyl ions) of the dielectric fluid from the conductivity of the dielectric fluid having variously changed pH. The switching control unit 17 obtains the pH of the dielectric fluid from the conductivity measured by the conductivity meter 13 while referring to the conductivity-pH information. The switching control unit 17 then controls the switching unit 16 to switch over the supply destination of the dielectric fluid from the dielectric-fluid tank 12 so that the pH of the dielectric fluid falls within a predetermined range. Alternatively, as the conductivity-pH information, a conductivity range in which the pH of the dielectric fluid falls within the predetermined range can be obtained in advance. In addition, the switching control unit 17 can control the switching unit 16 so that the conductivity measured by the conductivity meter 13 falls within the obtained conductivity range. Specifically, the switching control unit 17 controls the switching unit 16 based on the conductivity as follows. If the pH is higher than the predetermined pH, the switching control unit 17 controls the switching unit 16 to supply the dielectric fluid to the water purification unit 14 to reduce the pH. If the pH is lower than the predetermined value, the switching control unit 17 controls the switching unit 16 to supply the dielectric fluid to the corrosion-protection-ion generating unit 15 to raise the pH.

Each of the dielectric-fluid-stock-solution supply unit 11 and the dielectric-fluid tank 12 is connected to the switching unit 16 by a pipe, a hose or the like. A switching valve 21 is provided on a connection side of the switching unit 16 on which the dielectric-fluid-stock-solution supply unit 11 or the dielectric-fluid tank 12 is connected to the switching unit 16 to cause the dielectric fluid stock from the dielectric-fluid-stock-solution supply unit 11 or the dielectric fluid from the dielectric-fluid tank 12 to flow to the switching unit 16. A first pump 22 is provided between the dielectric-fluid-stock-solution supply unit 11 and the valve 21 for supplying the dielectric fluid stock to the switching unit 16. A second pump 23 is provided between the dielectric-fluid tank 12 and the valve 21 for supplying the dielectric fluid to the switching unit 16. Each of the water purification unit 14 and the corrosion-protection-ion generating unit 15 is connected to the dielectric-fluid tank 12 by a pipe, a hose, or the like.

A method of controlling the quality of the dielectric fluid by the dielectric-fluid quality control apparatus 10 will be explained. The switching control unit 17 controls the switching unit 16 to switch over the supply destination to the water purification unit 14 to cause the fluid in the dielectric-fluid quality control apparatus 10 to flow to the water purification unit 14. The freshwater that is the dielectric fluid stock is supplied from the dielectric-fluid-stock-solution supply unit 11 to the water purification unit 14 through the valve 21 and the switching unit 16 by the first pump 22. The water purification unit 14 eliminates the impurity ions in the freshwater while leaving a trace of impurity ions therein, generates the ion exchange water (pure water), and supplies the ion exchange water to the dielectric-fluid tank 12. The switching control unit 17 then controls the switching unit 16 to switch over the supply destination to the corrosion-protection-ion generating unit 15 to cause the fluid to flow to the corrosion-protection-ion generating unit 15. The ion exchange water in the dielectric-fluid tank 12 is thereby supplied to the corrosion-protection-ion generating unit 15 through the valve 21 and the switching unit 16 by the second pump 23.

In the corrosion-protection-ion generating unit 15, the impurity anions in the ion exchange water are substituted for the hydroxyl ions that are corrosion protection ions, and the resultant ion exchange water, i.e., the dielectric fluid is supplied to the dielectric-fluid tank 12. In addition, the impurity cations in the ion exchange water are substituted for the cations of the alkaline metal or the alkaline-earth metal. As a result, the dielectric fluid is turned into a basic aqueous solution, whereby a correlation can be held between the conductivity and the pH of the dielectric fluid. The conductivity meter 13 of the dielectric-fluid tank 12 measures the conductivity of the dielectric fluid and transmits the measuring result to the switching control unit 17. The switching control unit 17 compares the conductivity measured by the conductivity meter 13 with a reference conductivity corresponding to the predetermined pH. If the measured conductivity is higher than the reference conductivity, the pH of the dielectric fluid is higher than the predetermined pH. The switching control unit 17, therefore, controls the switching unit 16 to switch over the supply destination of the dielectric fluid to the water purification unit 14 to reduce the pH. If the measured conductivity is lower than the reference conductivity, the pH of the dielectric fluid is lower than the predetermined pH. The switching unit 16 is then controlled to switch over the supply destination of the dielectric fluid to the corrosion-protection-ion generating unit 15 to raise the pH. As can be seen, by measuring the conductivity of the dielectric fluid which has been turned into the basic aqueous solution in the dielectric-fluid tank 12, the conductivity and the pH of the dielectric fluid are controlled.

According to the first embodiment, the ion exchange water containing a predetermined amount of impurity ions is turned into the dielectric fluid that is the basic aqueous solution in which the impurity cations are substituted for the cations of the alkaline metal or the alkaline-earth metal and in which the impurity anions are substituted for the hydroxyl ions. The correlation is thereby held between the conductivity and the pH of the dielectric fluid. Therefore, it is advantageously possible to acquire necessary information for controlling the pH of the dielectric fluid only by measuring the conductivity thereof. Accordingly, it is unnecessary to employ the pH meter including the glass electrode for measuring the pH of the dielectric fluid and to perform maintenance of the pH meter.

Second Embodiment

According to the first embodiment, the outline of the dielectric-fluid quality control apparatus and the dielectric-fluid quality control method has been explained. According to a second embodiment of the present invention, a dielectric-fluid quality control apparatus configured as follows and an electrical-discharge machining apparatus that includes the dielectric-fluid quality control apparatus will be explained. A water-purification resin column consisting of a mixture resin of an $H^+$-form-cation-exchange resin and an $OH^-$-form-anion-exchange resin is employed as the water purification unit. In addition, an ion-exchange resin column consisting of a mixture resin of a $Na^+$-form-cation-exchange resin and an $OH^-$-form-anion-exchange resin is employed as the corrosion-protection-ion generating unit.

FIG. 2 is a schematic diagram of the configuration of the dielectric-fluid quality control apparatus according to the second embodiment. As explained above, the dielectric-fluid quality control apparatus 10A is configured as follows, as compared with the dielectric-fluid quality control apparatus 10 according to the first embodiment shown in FIG. 1. The water purification unit 14 is replaced by a water-purification resin column 14A consisting of the mixture resin of the $H^+$-form-cation-exchange resin and the $OH^-$-form-anion-exchange resin. The corrosion-protection-ion generating unit 15 is replaced by an ion-exchange resin column 15A consisting of the mixture resin of the $Na^+$-form-cation-exchange resin and the $OH^-$-form-anion-exchange resin. The dielectric-fluid-stock-solution supply unit 11 shown in FIG. 1 is replaced by a water tank 11A that stores freshwater. The other constituent elements of the dielectric-fluid quality control apparatus 10A are the same as those of the dielectric-fluid quality control apparatus 10 according to the first embodiment. They are, therefore, designated with the same reference numerals as those shown in FIG. 1 and will not be explained herein.

As the $H^+$-form-cation-exchange resin used in the water-purification resin column 14A, a resin including, as a base substance, styrene-divinylbenzene copolymer, phenol-formalin resin or the like and, as ion exchange groups, sulfonic groups can be used. For example, a commercially available product such as $H^+$ form Amberlite® IR120B (product name of Rohm and Haas Company) or $H^+$ form DIAION® SK1B (product name of Mitsubishi Chemical Corporation) can be used as the $H^+$-form-cation-exchange resin. As the $OH^-$-form-anion-exchange resin used in the water-purification resin column 14A, a resin including, as a base substance, a styrene-divinylbenzene copolymer and, as ion exchange groups, trimethyl ammonium groups, β-hydroxyethyl dimethyl ammonium groups or the like can be used. For example, a commercially available product such as OH⁻ form Amberlite® IRA400J (product name of Rohm and Haas Company) or OH⁻ form DIAION® SA10A (product name of Mitsubishi Chemical Corporation) can be used as the OH⁻-form-anion-exchange resin.

Freshwater (dielectric fluid stock) such as running water, industrial water or ground water serving as the source of the dielectric fluid is supplied to the water-purification resin column 14A consisting of the mixture of the H⁺-form-cation-exchange resin and the OH⁻-form-anion-exchange resin, thereby eliminating impurity ions in the freshwater. If K⁺ and Cl⁻, for example, are present as the impurity cations and the impurity anions in the freshwater, respectively, then K⁺ ions are captured by the H⁺-form-cation-exchange resin in the water purification resin in a reaction expressed by the following formula (7), and Cl⁻ ions are captured by the OH⁻ form anion exchange resin therein in a reaction expressed by the following formula (8).

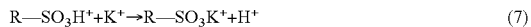  (7)

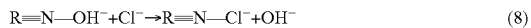  (8)

In the formulas (7) and (8), R denotes a polystyrene-based resin. As explained later, if the ion-exchange resin column 15A consisting of the Na⁺-form-cation-exchange resin and the OH⁻-form-anion-exchange resin is employed as the corrosion-protection-ion generating unit, the water-purification resin column 14A is controlled to leave a trace of impurity ions (conductivity of several to several tens of μS/cm) in the freshwater to generate the alkaline dielectric fluid.

As the Na⁺-form-cation-exchange resin in the ion-exchange resin column 15A, a resin including, as a base substance, styrene-divinylbenzene copolymer, phenol-formalin resin or the like and, as ion exchange groups, sulfonic groups can be used. For example, a commercially available product such as Na⁺ form Amberlite® IR120B (product name of Rohm and Haas Company) or Na⁺ form DIAION® SK1B (product name of Mitsubishi Chemical Corporation) can be used as the Na⁺-form-cation-exchange resin. As the OH⁻-form-anion-exchange resin in the ion-exchange resin column 15A, the same resin as the OH⁻-form-anion-exchange resin in the water-purification resin column 14A can be used. The OH⁻-form-anion-exchange resin is necessary to alkalize the dielectric fluid supplied to the ion-exchange resin column 15A. The OH⁻-form-anion-exchange resin substitutes OH⁻ ions for the impurity anions in the water.

By supplying the dielectric fluid to the ion-exchange resin column 15A consisting of the mixture resin of the Na⁺-form-cation-exchange resin and the OH⁻-form-anion-exchange resin, the impurity cations in the dielectric fluid are substituted for Na⁺ ions and the impurity anions therein are substituted for OH⁻ ions. If K⁺ and $SO_4^{2-}$, for example, are present as impurity cations and the impurity anions in the dielectric fluid, respectively, then the Na⁺-form-cation-exchange resin substitutes Na⁺ ions for K⁺ ions in a reaction expressed by the following formula (9), and the OH⁻-form-anion-exchange resin substitutes OH⁻ ions for $SO_4^{2-}$ ions in a reaction expressed by the following formula (10).

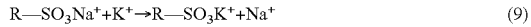  (9)

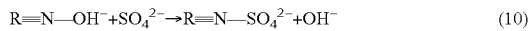  (10)

The impurity cations in the water are substituted for Na⁺ in the reaction expressed by the formula (9) although Na⁺ ions are not directly involved with water alkalinization. In addition, the impurity anions in the water are substituted for OH⁻ in the reaction expressed by the formula (10). The dielectric fluid is, therefore, turned into a NaOH aqueous solution (alkaline water).

If the concentration of the NaOH aqueous solution is determined, the conductivity and the pH thereof are determined because of the correlation between the concentration of the NaOH aqueous solution or conductivity and the pH. FIG. 3 is a chart that depicts the relationship between the conductivity and the pH of the NaOH aqueous solution. In FIG. 3, a horizontal axis indicates the pH of the NaOH aqueous solution and a vertical axis indicates the conductivity thereof. As shown in FIG. 3, if the pH of the NaOH aqueous solution rises, the conductivity thereof also rises, and the correlation is held between the pH and the conductivity. In other words, if the conductivity is determined, the corresponding pH is also determined. The Na⁺-form-cation-exchange resin is, therefore, used to hold the correlation between the conductivity and the pH. More specifically, the Na⁺-form-cation-exchange resin is used to turn the dielectric fluid into the basic aqueous solution. For this reason, as long as the correlation can be held between the conductivity and the pH, a cation exchange resin such as $Ca^{2+}$ form or K⁺ form other than the Na⁺-form-cation-exchange resin can be used.

Procedures of controlling the quality of the dielectric fluid by the dielectric-fluid quality control apparatus will be explained. Procedures of turning the dielectric fluid stock into the dielectric fluid (ion exchange water (pure water) having the predetermined conductivity) will be explained first. The freshwater that is the dielectric fluid stock in the water tank 11A is supplied to the water-purification resin column 14A through the valve 21 and the switching unit 16. Impurity ions (Na⁺, $Ca^{2+}$, Cl⁻, $SO_4^{2-}$ or the like) in the freshwater are eliminated and the ion exchange water (pure water) having the conductivity of several to several tens of μS/cm and the smaller amount of impurity ions is generated. The ion exchange water is then supplied to the ion-exchange resin column 15A consisting of the mixture resin of the Na⁺-form-cation-exchange resin and the OH⁻-form-anion-exchange-resin. The impurity cations and the impurity anions in the ion exchange water are substituted for Na⁺ and OH⁻ ions, respectively to provide the dielectric fluid. As a result, the ion exchange water is turned into the alkaline NaOH aqueous solution that the pH and the conductivity of which correlate to each other.

Procedures of controlling the dielectric fluid will be explained. The ion exchange water generated from the dielectric fluid stock is used as the dielectric fluid for the electrical-discharge machining apparatus. It is necessary to control the dielectric fluid to have the predetermined conductivity and the predetermined pH. The amount of anions contained in the ion exchange water before being supplied to the ion-exchange resin column 15A corresponds to the amount by which the anions contained therein are substituted for the OH⁻ ions. By controlling the conductivity of the dielectric fluid based on which it is determined whether the amount of anions is large or small, therefore, the amount of OH⁻ ions generated by the ion-exchange resin column 15A, i.e., the pH of the dielectric fluid can be controlled. In other words, if the conductivity is higher than the reference conductivity corresponding to the predetermined pH, the dielectric fluid is supplied to the water-purification resin column 14A to reduce the conductivity, i.e., the pH. Conversely, if the conductivity is lower than the reference conductivity corresponding to the predetermined pH, the dielectric fluid is supplied to the ion-exchange resin column 15A to raise the conductivity, i.e., the pH.

Figure 4:
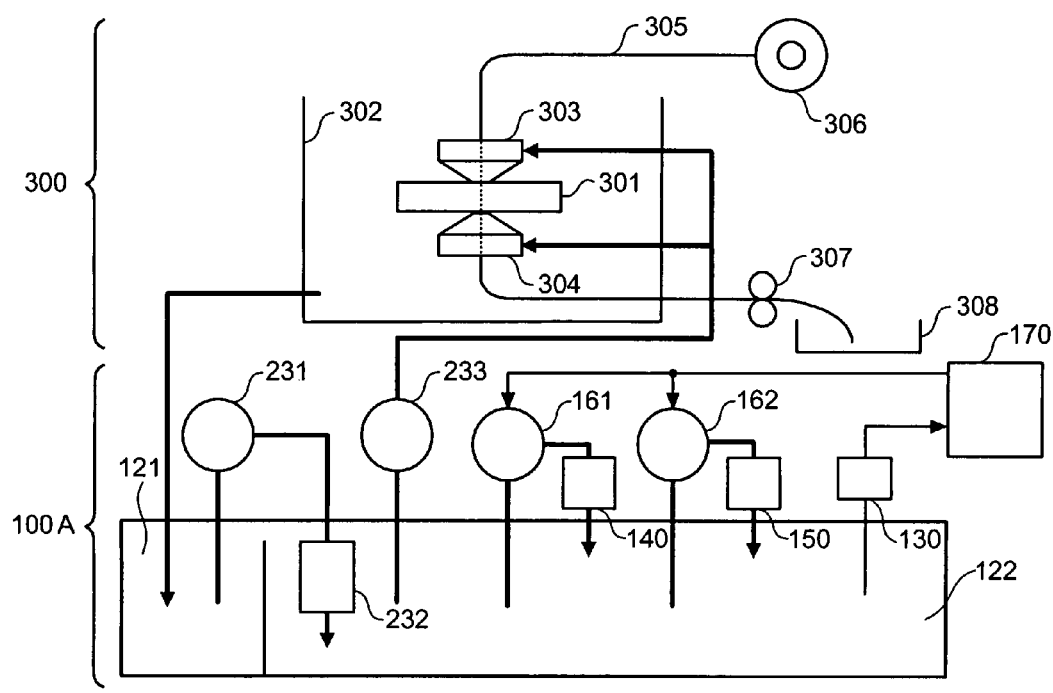
FIG. 4 is a schematic diagram of a configuration example of an electrical-discharge machining apparatus that includes the dielectric-fluid quality control apparatus shown in FIG. 2.

The electrical-discharge machining apparatus that includes the dielectric-fluid quality control apparatus shown in FIG. 2 will be explained next. FIG. 4 is a schematic diagram of a configuration example of the electrical-discharge machining apparatus that includes the dielectric-fluid quality control apparatus shown in FIG. 2. The electrical-discharge machining apparatus is configured by an electrical-discharge machining unit 300 that performs an electrical-discharge-machining process on a workpiece 301, and a dielectric-fluid quality control unit 100A that circulates the dielectric fluid used in the electrical-discharge machining unit 300 to clean and recycle the dielectric fluid.

The electrical-discharge machining unit 300 includes a machining tank 302, an upper dielectric-fluid nozzle 303 and a lower dielectric-fluid nozzle 304, a wire electrode 305, a wire bobbin 306, a collection roller 307, and a collection box 308. The machining tank 302 stores the dielectric fluid and performs the electrical-discharge-machining process on the workpiece 301. The upper dielectric-fluid nozzle 303 and the lower dielectric-fluid nozzle 304 eject the dielectric fluid from below and above the workpiece 301. The wire electrode 305 is used to perform the electrical-discharge-machining process on the workpiece 301. The wire bobbin 306 is a bobbin around which the wire electrode 305 is wound. The collection roller 307 transports and collects the wire electrode 305 spread from the wire bobbin 306 through the upper dielectric-fluid nozzle 303 and the lower dielectric-fluid nozzle 304. The collection box 308 collects the wire electrode 305 after the process. In the machining tank 302 of the electrical-discharge machining unit 300, discharge is generated between the workpiece 301 and the wire electrode 305 through the dielectric fluid, thereby executing the electrical-discharge-machining process.

The dielectric-fluid quality control unit 100A includes a waste-fluid tank 121, a filter pump 231, a filter 232, a clean-fluid tank 122, a dielectric-fluid pump 233, a water-purification resin column 140, a water-purification resin pump 161, a corrosion-protection resin column 150, a corrosion-protection resin pump 162, a conductivity meter 130, and a switching control unit 170. The waste-fluid tank 121 is a tank to which the dielectric fluid is supplied from the machining tank 302. The filter 232 pumps up the dielectric fluid from the waste-fluid tank 121. The filter 232 filters the dielectric-fluid pumped up by the filter pump 231. The clean-fluid tank 122 stores the dielectric fluid passed through the filter 232. The dielectric-fluid pump 233 is a pump for ejecting the dielectric fluid stored in the clean-fluid tank 122 into a space between the workpiece 301 and the wire electrode 305 through the upper dielectric-fluid nozzle 303 and the lower dielectric-fluid nozzle 304 of the electrical-discharge machining unit 300. The water-purification resin column 140 stores the water purification resin for eliminating impurity ions in the dielectric fluid. The water-purification resin pump 161 pumps up the dielectric fluid from the clean-fluid tank 122 and supplies the dielectric fluid to the water-purification resin column 140. The corrosion-protection resin column 150 stores the corrosion protection resin that substitutes ions for the impurity contained in the dielectric fluid stored in the clean-fluid tank 122, and alkalizes the dielectric fluid. The corrosion-protection resin pump 162 pumps up the dielectric fluid from the clean-fluid tank 122 and supplies the dielectric fluid to the corrosion-protection resin column 150. The conductivity meter 130 measures the conductivity of the dielectric fluid. The switching control unit 170 activates both of or one of the water-purification resin pump 161 and the corrosion-protection resin pump 162 based on measurement values of the conductivity meter 130.

In the electrical-discharge machining apparatus configured as explained above, the dielectric fluid that has been passed through the water-purification resin column 140 and the corrosion-protection resin column 150 is returned again to the clean-fluid tank 122. The dielectric fluid in the clean-fluid tank 122 is ejected into the space between the wire electrode 305 and the workpiece 301 from the upper dielectric-fluid nozzle 303 and the lower dielectric-fluid nozzle 304 by the dielectric-fluid pump 233, and temporarily stored in the dielectric-fluid tank 12.

An operation performed by the wire discharge machining apparatus shown in FIG. 4 during the electrical-discharge-machining process will be explained. The electrical discharge machining is performed as follows. A voltage is applied between the workpiece 301 and the wire electrode 305. Electrical discharge is generated therebetween through the dielectric fluid ejected from the upper dielectric-fluid nozzle 303 and the lower dielectric-fluid nozzle 304. The workpiece 301 is thereby molten and eliminated. At this moment, a discharge portion of the wire electrode 305 is molten and deteriorated following the electrical discharge machining. Therefore, the wire electrode 305 wound around the wire bobbin 306 is continuously fed to the collection box 308 through the upper dielectric-fluid nozzle 303, the lower dielectric-fluid nozzle 304, and the collection roller 307 to supply a new wire electrode 305 to the electrical-discharge machining unit 300 as the machining progresses. The dielectric fluid ejected from the upper dielectric-fluid nozzle 303 and the lower dielectric-fluid nozzle 304, which has washed off sludge generated in the machining unit and which then turns into a state in which the dielectric fluid contains much impurity, is temporarily stored in the machining tank 302.

The dielectric fluid in the machining tank 302 is then introduced into the waste-fluid tank 121 through a piping path, and the dielectric fluid in the waste-fluid tank 121 is fed to the filter 232 by the filter pump 231. The impurity-containing dielectric fluid is passed through the filter 232 to filter out the impurity, and the resultant dielectric fluid is stored in the clean-fluid tank 122. The conductivity meter 130 measures the conductivity of the dielectric fluid in the clean-fluid tank 122 and transmits the measurement result to the switching control unit 170.

Figures 5, 6:
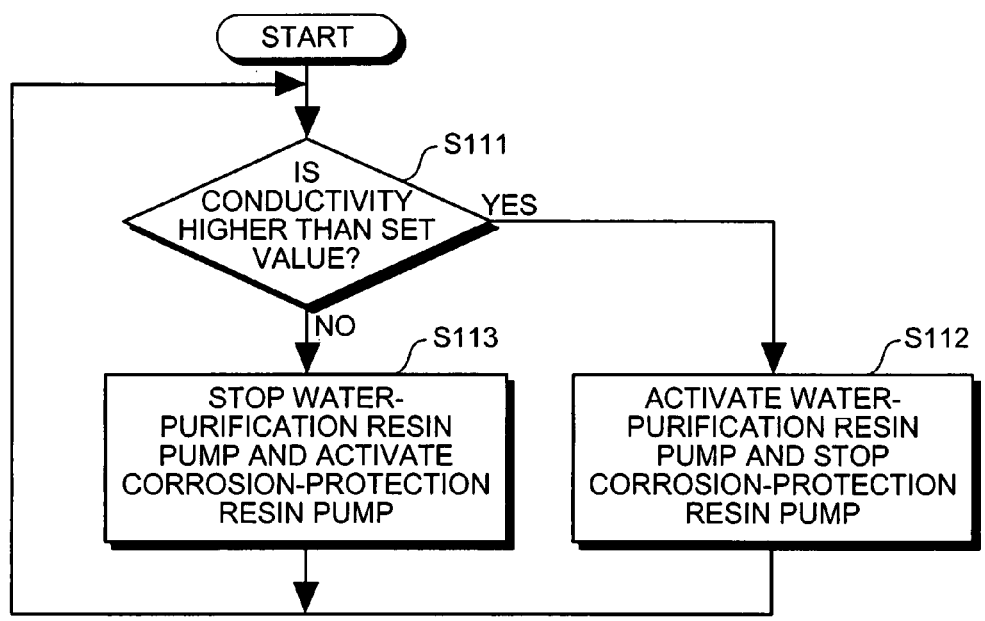
FIG. 5 depicts a control operation performed by a switching control unit.
FIG. 6 is a flowchart of a switching process performed by the switching control unit.

FIG. 5 depicts a control operation performed by the switching control unit. FIG. 6 is a flowchart of a switching process performed by the switching control unit. To perform stable discharge machining without reducing the corrosion protection effect on the workpiece 301, it is necessary to maintain the conductivity (that is correlated with pH) of the dielectric fluid to the predetermined set value (reference conductivity). The switching control unit 170 performs a control process therefor. As shown in FIG. 5, if the value measured by the conductivity meter 130 is higher than the set value, then the switching control unit 170 activates the water-purification resin pump 161 and stops the corrosion-protection resin pump 162. If the value measured by the conductivity meter 130 is lower than the set value, then the switching control unit 170 stops the water-purification resin pump 161 and activates the corrosion-protection resin pump 162.

In other words, the switching control unit 170 determines whether the measured conductivity (that is correlated with pH) of the dielectric fluid is higher than the predetermined set value (step S111). If the conductivity (that is correlated with pH) of the dielectric fluid is higher than the predetermined set value ("Yes" at step S111), the switching control unit 170 activates the water-purification resin pump 161 and stops the corrosion-protection resin pump 162 (step S112). The dielectric fluid in the clean-fluid tank 122 is supplied to the water-purification resin column 14A through the piping path. The impurity ions such as metal ions generated by the electrical discharge machining and carbonate ions resulting from dissolution of carbonate gas into the air are thereby eliminated, and the conductivity (that is correlated with pH) of the dielectric fluid is reduced.

If the conductivity (that is correlated with pH) of the dielectric fluid is lower than the predetermined set value ("No" at step S111), the switching control unit 170 stops the water-purification resin pump 161 and activates the corrosion-protection resin pump 162 (step S113). The dielectric fluid in the clean-fluid tank 122 is supplied to the corrosion-protection resin column 150 through the piping path to maintain the pH and to prevent deterioration of the corrosion protection characteristic of the dielectric fluid. The conductivity (that is correlated with pH) of the dielectric fluid is thereby maintained near the preset value. The electrical-discharge machining apparatus performs the electrical-discharge-machining process as explained above.

A process result obtained when the quality control is exercised over the dielectric fluid by the apparatus configured as explained in the second embodiment will be explained. The $H^+$ form Amberlite® IR120B (product name of Rohm and Haas Company) and the $OH^-$ form Amberlite® IRA400J (product name of Rohm and Haas Company) are used for the water-purification resin column 140. The $Na^+$ form Amberlite® IR120B (product name of Rohm and Haas Company) and the $OH^-$ form Amberlite® IRA400J (product name of Rohm and Haas Company) are used for the corrosion-protection resin column 150. In addition, as an initial state of the electrical discharge machining, the running water (conductivity of 147 µS/cm and pH of 7.2) that is the dielectric fluid stock is supplied to the clean-fluid tank 122 of the dielectric-fluid quality control unit 100A. The set value for controlling the conductivity is 14 µS/cm. A process until the dielectric fluid (conductivity of 14 µS/cm and pH of 9.5) having the conductivity and the corrosion protection function suited for the electrical discharge machining is generated will be explained first, followed by explanation of a result of machining and immersing the workpiece using the generated dielectric fluid.

The conductivity of the running water that is the dielectric fluid stock is 147 (µS/cm, which is higher than the set value for controlling the conductivity. Therefore, according to the flowchart shown in FIG. 6, the dielectric fluid in the clean-fluid tank 122 is supplied to the water-purification resin column 140, and the process for eliminating impurity ions is repeatedly performed. As a result, the ion exchange water having a conductivity of 14 µS/cm and a pH of 6.2 is generated. Thereafter, if the conductivity of the dielectric fluid in the clean-fluid tank 122 is equal to or lower than 14 µS/cm, the dielectric fluid is supplied to the corrosion-protection resin column 150. As shown in the flowchart of FIG. 6, the process for substituting hydroxyl ions for the impurity anions is repeatedly performed until the conductivity of the dielectric fluid is equal to the conductivity corresponding to the pH of 9.5.

Figure 7:
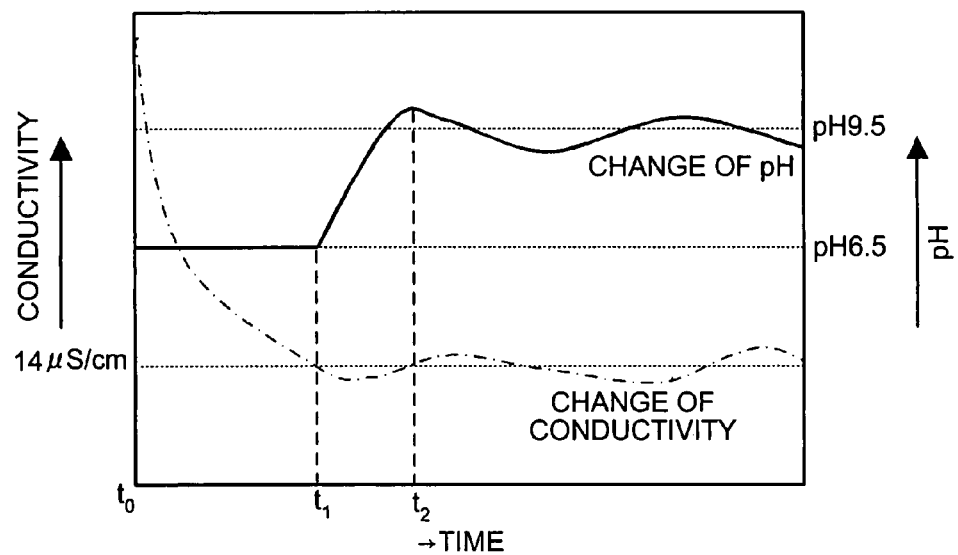
FIG. 7 is a chart that depicts changes in the conductivity and the pH of the dielectric fluid with passage of time since running water is supplied.

FIG. 7 is a chart that depicts changes in the conductivity and the pH of the dielectric fluid with passage of time since the running water is supplied. In FIG. 7, a horizontal axis indicates time passing since time (=t0) at which the dielectric fluid stock is supplied, a left vertical axis indicates the conductivity of the dielectric fluid, and a right vertical axis indicates the pH of the dielectric fluid. In a period between the time t0 at which the dielectric fluid stock is supplied and time t1, a process for eliminating the impurity ions in the dielectric fluid stock to reduce the conductivity down to the predetermined reference conductivity is performed. In this period, no correlation is observed between the conductivity and the pH. However, at the time t1 at which the conductivity is equal to the predetermined set value, the impurity cations are substituted for $Na^+$ ions and the impurity anions are substituted for $OH^-$ ions. At time t2, conditions of the conductivity of 14 µS/cm and the pH of 9.5 on a line of the relationship between the conductivity and the pH shown in FIG. 4 are satisfied. After the time t2, a good correlation can be held between the conductivity and the pH.

Thereafter, the ion exchange water having the conductivity of 14 µS/cm and the pH of 9.5 is used as the dielectric fluid, and WC—Co that is the cemented carbide and Cu and Fe that are metals are machined and immersed in the dielectric fluid for four days. As a result, WC—Co, Cu, and Fe are discolored only slightly but hardly corroded.

As a comparison example, ion exchange water having a conductivity of 7.8 µS/cm and a pH of 5.8, which water has been supplied not to the corrosion-protection resin column 150 but to the water-purification resin column 140 only, is used as the dielectric fluid. WC—Co, Cu, and Fe are similarly machined and immersed in the dielectric fluid for four days. As a result, WC—Co and Cu develop corrosion, which is worse than discoloration.

According to the second embodiment, the water-purification resin column 140 consisting of the mixture of the $H^+$-form-cation-exchange resin and the $OH^-$-form-anion-exchange resin controls the impurity ions in the dielectric fluid to have the predetermined amount. Furthermore, the corrosion-protection resin pump 162 consisting of the mixture of the $Na^+$-form-cation-exchange-resin and the $OH^-$-form-anion-exchange resin substitutes predetermined amounts of cations and hydroxyl ions for the predetermined amount of impurity ions, thereby turning the dielectric fluid into the basic aqueous solution. It is, therefore, advantageously possible to hold the correlation between the conductivity and the pH of the dielectric fluid. As a result, the pH of the dielectric fluid can be controlled only by measuring the conductivity of the dielectric fluid even if the pH meter is not provided, and the workpiece 301 can be protected from corrosion.

Third Embodiment

According to a third embodiment of the present invention, a dielectric-fluid quality control apparatus configured as follows and an electrical-discharge machining apparatus that includes the dielectric-fluid quality control apparatus will be explained. The water purification unit and the corrosion-protection-ion generating unit according to the first embodiment are replaced by an $H^+$-form-cation-exchange resin column, a $Na^+$-form-cation-exchange resin column, and an $OH^-$-form-anion-exchange column.

Figure 8:
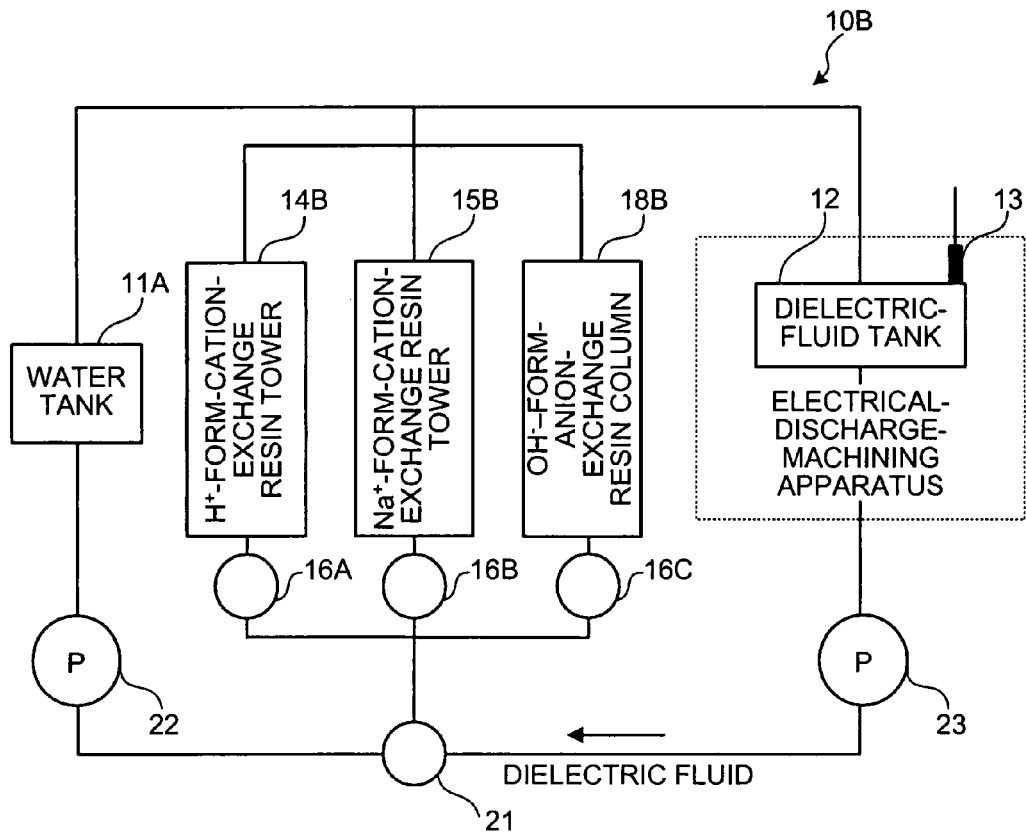
FIG. 8 is a schematic diagram of a configuration of a dielectric-fluid quality control apparatus according to a third embodiment of the present invention.

FIG. 8 is a schematic diagram of a configuration of the dielectric-fluid quality control apparatus according to the third embodiment. As explained above, the dielectric-fluid quality control apparatus 10B is configured as follows, as compared with the dielectric-fluid quality control apparatus 10 according to the first embodiment shown in FIG. 1. The water purification unit 14 and the corrosion-protection-ion generating unit 15 are replaced by a $H^+$-form-cation-exchange resin column 14B consisting only of an $H^+$-form-cation-exchange resin, a $Na^+$-form-cation-exchange resin column 15B consisting only of a $Na^+$-form-cation-exchange resin, and an $OH^-$-form-anion-exchange resin column 18B consisting only of an $OH^-$-form-anion-exchange. Valves 16A to 16C corresponding to the switching unit 16 and provided on the respective columns 14B, 15B, and 18B on the side of the water tank 11A and dielectric-fluid tank 12, are controlled to be opened or closed. Each of the columns 14B, 15B, and 18B thereby functions as the water purification unit 14 or the corrosion-protection-ion generating unit 15. That is, by supplying the dielectric fluid to the $H^+$-form-cation-exchange resin column 14B and the $OH^-$-form-anion-exchange resin column 18B, an equivalent process as that performed by the water purification unit 14 according to the first embodiment is executed. By supplying the dielectric fluid to the $Na^+$-form-cation-exchange resin column 15B and the $OH^-$-form-anion-exchange resin column 18B, an equivalent process as that performed by the corrosion-protection-ion generating unit 15 according to the first embodiment is executed. As the respective ion exchange resins used in the third embodiment, the same resins as those shown in the second embodiment can be used.

Procedures of quality control over the dielectric fluid by the dielectric-fluid quality control apparatus 10B will be explained. The freshwater that is the dielectric fluid stock supplied from the water tank 11A by the first pump 22 is supplied to the $H^+$-form-cation-exchange resin column 14B and the $OH^-$-form-anion-exchange resin column 18B by opening the valves 16A and 16C and closing the valve 16B. Impurity ions ($Na^+$, $Ca^{2+}$, $Cl^-$, $SO_4^{2-}$, or the like) in the freshwater are thereby eliminated and the ion exchange water having the conductivity of about several to several tens of $\mu S/cm$ and containing the smaller amount of impurity ions is generated. Thereafter, the valves 16B and 16C are opened and the valve 16A is closed, thereby supplying the ion exchange water to the $Na^+$-form-cation-exchange resin column 15B and the $OH^-$-form-anion-exchange resin column 18B. The impurity cations and the impurity anions in the ion exchange water are substituted for $Na^+$ and $OH^-$ ions, respectively. As a result, the ion exchange water is turned into the alkaline NaOH aqueous solution the pH and the conductivity of which correlate to each other.

The amount of anions contained in the ion exchange water before being supplied to the $Na^+$-form-cation-exchange resin column 15B and the $OH^-$-form-anion-exchange resin column 18B corresponding to the corrosion-protection-ion generating unit 15, corresponds to the amount by which the anions contained therein are substituted for the $OH^-$ ions. By controlling the conductivity based on which it is determined whether the amount of anions is large or small, therefore, the amount of $OH^-$ ions generated by the $OH^-$ form anion exchange resin, i.e., the pH of the dielectric fluid can be controlled.

The electrical-discharge machining apparatus that includes the dielectric-fluid quality control apparatus shown in FIG. 8 will be explained. FIG. 9 is a schematic diagram of a configuration example of the electrical-discharge machining apparatus that includes the dielectric-fluid quality control apparatus shown in FIG. 8. The electrical-discharge machining apparatus is configured by the electrical-discharge machining unit 300 that performs an electrical-discharge-machining process on the workpiece 301, and a dielectric-fluid quality control unit 100B that circulates the dielectric fluid used in the electrical-discharge machining unit 300 to clean and recycle the dielectric fluid. The electrical-discharge machining apparatus according to the third embodiment is the same as that according to the second embodiment in the electrical-discharge machining unit 300, but different therefrom in a part of the dielectric-fluid quality control unit 100B. The same constituent elements as those according to the second embodiment are designated with the same reference numerals as those according to the second embodiment and will not be explained herein.

The clean-fluid tank 122 of the dielectric-fluid quality control unit 100B includes an $H^+$-form-cation-exchange resin column 141, an $H^+$-form-cation-exchange resin pump 163, an $OH^-$-form-anion-exchange resin column 180, an $OH^-$-form-anion-exchange resin pump 181, a $Na^+$-form-cation-exchange resin column 151, and a $Na^+$-form-cation-exchange resin pump 164. The $H^+$-form-cation-exchange resin column 141 stores an $H^+$-form-cation-exchange resin. The $H^+$-form-cation-exchange resin pump 163 pumps up the dielectric fluid from the clean-fluid tank 122, and supplies the dielectric fluid to the $H^+$-form-cation-exchange resin column 141. The $OH^-$-form-anion-exchange resin column 180 stores an $OH^-$-form-anion-exchange resin. The $OH^-$-form-anion-exchange resin pump 181 pumps up the dielectric fluid from the clean-fluid tank 122, and supplies the dielectric fluid to the $OH^-$-form-anion-exchange resin column 180. The $Na^+$-form-cation-exchange resin column 151 stores a $Na^+$-form-cation-exchange resin. The $Na^+$-form-cation-exchange resin pump 164 pumps up the dielectric fluid from the clean-fluid tank 122, and supplies the dielectric fluid to the $Na^+$-form-cation-exchange resin column 151. The switching control unit 170 controls the $H^+$-form-cation-exchange resin pump 163, the $OH^-$-form-anion-exchange resin pump 181, and the $Na^+$-form-cation-exchange resin pump 164 to be activated or stopped based on the value measured by the conductivity meter 130. The dielectric fluid that has been passed through the $H^+$-form-cation-exchange resin column 141, the $OH^-$-form-anion-exchange resin column 180, and the $Na^+$-form-cation-exchange resin column 151 is returned again to the clean-fluid tank 122.

An operation performed by the electrical-discharge machining apparatus shown in FIG. 9 during the electrical-discharge-machining process will be explained. Since the process performed by the electrical-discharge machining unit 300 is the same as that performed by the electrical-discharge machining unit 300 according to the second embodiment, it will not be explained herein. As explained in the second embodiment, the impurity-containing dielectric fluid temporarily stored in the machining tank 302 by the electrical-discharge-machining process is introduced into the waste-fluid tank 121. After the impurity in the dielectric fluid is filtered out, the resultant dielectric fluid is stored in the clean-fluid tank 122. The conductivity meter 130 measures the conductivity of the dielectric fluid in the clean-fluid tank 122, and transmits the measurement result to the switching control unit 170.

Figure 11:
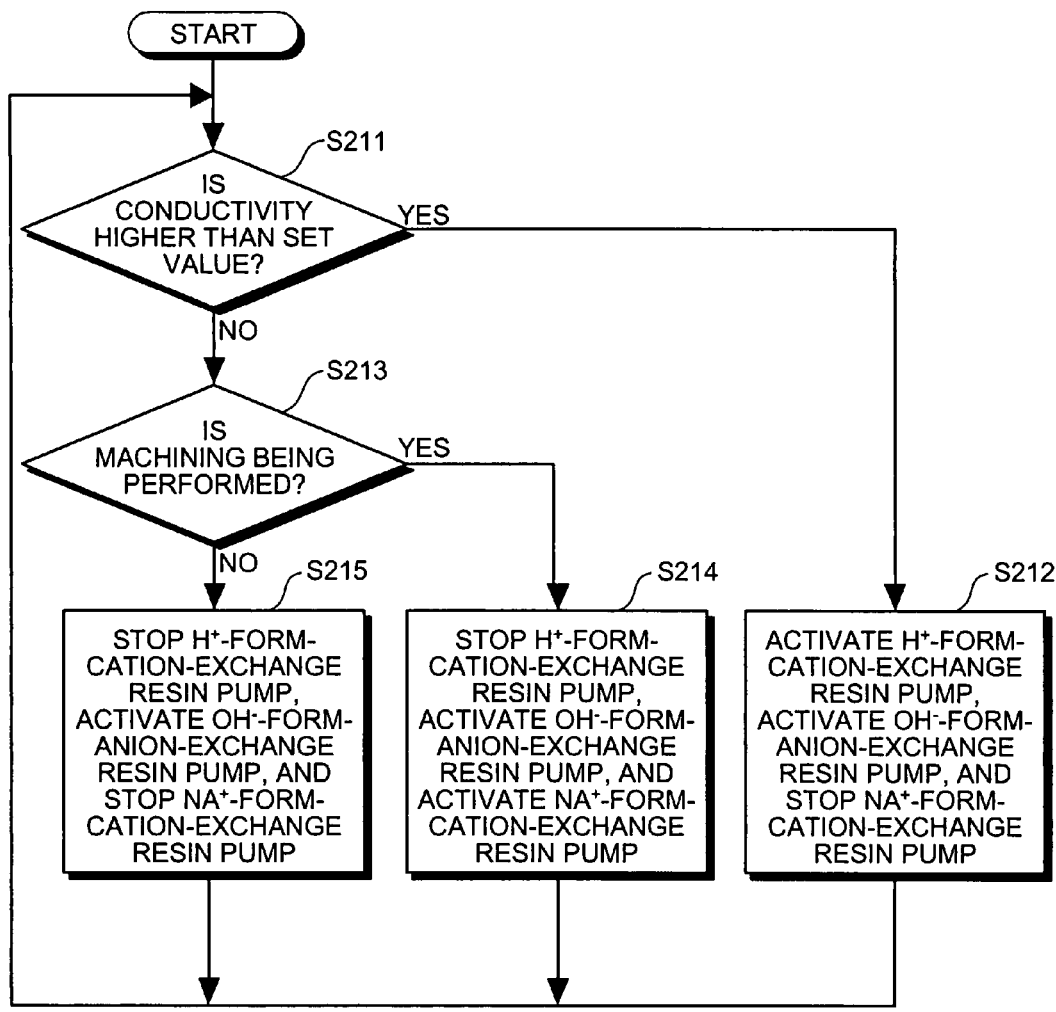
FIG. 11 is a flowchart of a switching process performed by the switching control unit.

FIG. 10 depicts a control operation performed by the switching control unit. FIG. 11 is a flowchart of a switching process performed by the switching control unit. To perform stable discharge machining without reducing the corrosion protection effect on the workpiece 301, it is necessary to maintain the conductivity (that is correlated with pH) of the dielectric fluid to the predetermined set value (reference conductivity). The switching control unit 170 performs a process therefor. As shown in FIG. 10, if the value measured by the conductivity meter 130 is higher than the set value, then the switching control unit 170 activates the H+-form-cation-exchange resin pump 163 and the OH—form-anion-exchange resin pump 181, and stops the Na+-form-cation-exchange resin pump 164. In addition, the dielectric fluid in the clean-fluid tank 122 is supplied to the H+-form-cation-exchange resin column 141 and the OH—form-anion-exchange resin column 180 through the piping path. If the conductivity of the dielectric fluid during machining time is lower than the set value, the switching control unit 170 activates the OH—form-anion-exchange resin pump 181 and the Na+-form cation-exchange resin pump 164 and stops the H+-form-cation-exchange resin pump 163 to maintain the pH and to prevent deterioration of the corrosion protection characteristic of the dielectric fluid. In addition, the dielectric fluid in the clean-fluid tank 122 is supplied to the OH⁻-form-anion-exchange resin column 180 and the Na+-form-cation-exchange resin column 151 through the piping path.

Furthermore, if the conductivity of the dielectric fluid during non-machining time is lower than the set value, the switching control unit 170 activates the OH⁻-form-anion-exchange resin pump 181 and stops the H⁺-form-cation-exchange resin pump 163 and the Na⁺-form-cation-exchange resin pump 164 to maintain the corrosion protection effect during the non-machining time. In addition, the dielectric fluid in the clean-fluid tank 122 is supplied to the OH⁻-form-anion-exchange resin column 180 through the piping path.

In other words, the switching control unit 170 determines whether the measured conductivity (that is correlated with pH) of the dielectric fluid is higher than the predetermined set value (step S211). If the conductivity (that is correlated with pH) of the dielectric fluid is higher than the predetermined set value ("Yes" at step S211), the switching control unit 170 activates the H+-form-cation-exchange resin pump 163 and the OH—form-anion-exchange resin pump 181 and stops the Na+-form-cation-exchange resin pump 164 (step S212). The dielectric fluid in the clean-fluid tank 122 is supplied to the H+-form-cation-exchange resin column 141 and the OH—form-anion-exchange resin column 180 through the piping path. The impurity ions such as metal ions generated by the electrical discharge machining and carbonate ions resulting from dissolution of carbonate gas into the air are thereby eliminated, and the conductivity (that is correlated with pH) of the dielectric fluid is reduced.

If the conductivity (that is correlated with pH) of the dielectric fluid is lower than the predetermined set value ("No" at step S211), the switching control unit 170 determines whether the machining is being performed on the workpiece 301 (step S213). If the machining is being performed ("Yes" at step S213), the switching control unit 170 stops the H⁺-form-cation-exchange resin pump 163 and activates the OH⁻-form-anion-exchange resin pump 181 and the Na⁺-form-cation-exchange resin pump 164 (step S214). The dielectric fluid in the clean-fluid tank 122 is supplied to the OH⁻-form-anion-exchange resin column 180 and the Na⁺-form-cation-exchange resin column 151 through the piping path to maintain the pH and to prevent deterioration of the corrosion protection characteristic of the dielectric fluid. The conductivity (that is correlated with pH) of the dielectric fluid is thereby maintained near the preset value.

On the other hand, if the machining is not being performed ("No" at step S213), the switching control unit 170 stops the H⁺-form-cation-exchange resin pump 163 and the Na⁺-form-cation-exchange resin pump 164 and activates the OH⁻-form-anion-exchange resin pump 181 (step S215). The OH⁻-form-anion-exchange resin pump 181 is activated and the dielectric fluid in the clean-fluid tank 122 is supplied to the OH⁻-form-anion-exchange resin column 180 through the piping path to maintain the pH and to prevent deterioration of the corrosion protection characteristic of the dielectric fluid. The conductivity (that is correlated with pH) of the dielectric fluid is thereby maintained near the preset value.

A process result obtained when the quality control is exercised over the dielectric fluid by the apparatus configured as explained in the third embodiment will be explained. As an initial state of the electrical discharge machining, the running water (conductivity of 147 μS/cm and pH of 7.2) that is the dielectric fluid stock is supplied to the clean-fluid tank 122 of the electrical-discharge machining apparatus. The set value for controlling the conductivity is 14 μS/cm. A process until the dielectric fluid (conductivity of 14 μS/cm and pH of 9.5) having the conductivity and the corrosion protection function suited for the electrical discharge machining is generated will be explained first, followed by explanation of a result of machining and immersing the workpiece using the generated dielectric fluid.

The conductivity of the running water that is the dielectric fluid stock is 147 μS/cm, which is higher than the set value for controlling the conductivity. Therefore, according to the flowchart shown in FIG. 11, the dielectric fluid in the clean-fluid tank 122 is supplied to the H⁺-form-cation-exchange resin column 141 and the OH⁻-form-anion-exchange resin column 180. In addition, the process for eliminating impurity ions is repeatedly performed. As a result, the ion exchange water having the conductivity of 14 μS/cm and the pH of 6.2 is generated. Thereafter, if the conductivity of the dielectric fluid in the clean-fluid tank 122 is equal to or lower than 14 μS/cm, the dielectric fluid is supplied to the OH⁻-form-anion-exchange resin column 180 since the workpiece 301 is not being machined (machining is not started yet). In addition, the process for substituting hydroxyl ions for the impurity anions is repeatedly performed until the conductivity of the dielectric fluid is equal to the conductivity corresponding to the pH of 9.5. If the workpiece 301 is being machined, then the dielectric fluid is supplied to the OH⁻-form-anion-exchange resin column 180 and the Na⁺-form-cation-exchange resin column 151, and the process according to the flowchart shown in FIG. 11 is repeatedly executed until the pH is equal to 9.5. At this time, the conductivity of the ion exchange water is 14 μS/cm, and the conductivity of 14 μS/cm and the pH of 9.5 are on the line of the relationship between the conductivity and the pH shown in FIG. 1. A good correlation can be held between the conductivity and the pH.

Thereafter, the ion exchange water having the conductivity of 14 μS/cm and the pH of 9.5 is used as the dielectric fluid, and WC—Co that is the cemented carbide and Cu and Fe that are metals are machined and immersed in the dielectric fluid for four days. As a result, WC—Co, Cu, and Fe are discolored only slightly but hardly corroded.

As a comparison example, the ion exchange water (conductivity of 7.8 μS/cm and pH of 6.8) which water has been supplied not to the OH⁻-form-anion-exchange resin column 180 and the Na⁺-form-cation-exchange resin column 151 but to the H⁺-form-cation-exchange resin column 141 and the OH⁻-form-anion-exchange resin column 180 only, is used as the dielectric fluid. WC—Co, Cu, and Fe are machined and immersed in the dielectric fluid for four days. As a result, WC—Co, Cu, and Fe develop corrosion, which is worse than discoloration.

According to the third embodiment, the conductivity and the pH of the dielectric fluid are controlled using the three types of the ion-exchange resin columns 141, 151, and 180 for the H⁺-form-cation-exchange resin, the Na⁺-form-cation-exchange resin, and the OH⁻-form-anion-exchange resin, respectively, as well as the conductivity meter 130 under presence of the dissolved oxygen. It is thereby advantageously possible to protect the cemented carbide (WC—Cu) or the metal (Cu or Fe) from corrosion.

Fourth Embodiment

According to a fourth embodiment of the present invention, a dielectric-fluid quality control apparatus configured as follows and an electrical-discharge machining apparatus that includes the dielectric-fluid quality control apparatus will be explained. The water purification unit according to the first embodiment is replaced by a water-purification resin column consisting of a mixture resin of an H+-form-cation-exchange resin and an OH−-form-anion-exchange resin. The corrosion-protection-ion generating unit according to the first embodiment is replaced by an ion-exchange resin column consisting of a mixture resin of a Na+-form-cation-exchange resin and an OH−-form-anion-exchange resin.

Figure 12:
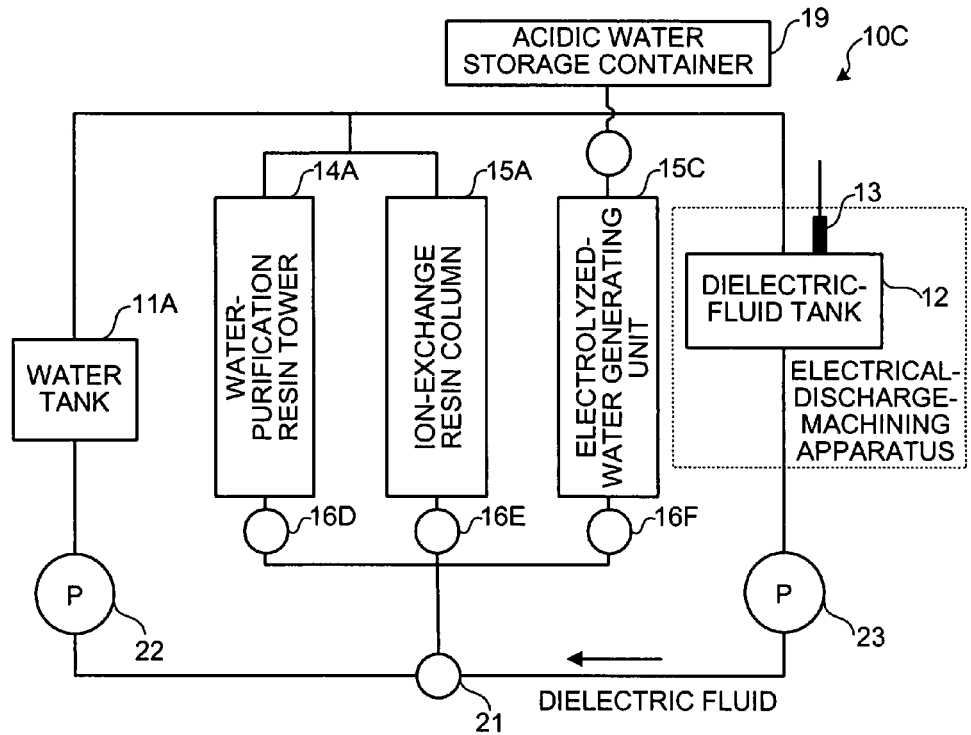
FIG. 12 is a schematic diagram of a configuration of a dielectric-fluid quality control apparatus according to a fourth embodiment of the present invention.

FIG. 12 is a schematic diagram of a configuration of the dielectric-fluid quality control apparatus according to the fourth embodiment. The dielectric-fluid quality control apparatus 10C includes the water-purification resin column 14A, the ion-exchange resin column 15A, and an electrolyzed-water generating unit 15C. As explained above, the dielectric-fluid quality control apparatus 10C is configured as follows, as compared with the dielectric-fluid quality control apparatus 10 according to the first embodiment shown in FIG. 1. The water purification unit 14 is replaced by the water-purification resin column 14A consisting of the mixture resin of the H+-form-cation-exchange resin and the OH−-form-anion-exchange resin. The corrosion-protection-ion generating unit 15 is replaced by the ion-exchange resin column 15A consisting of the mixture resin of the Na+-form-cation-exchange resin and the OH−-form-anion-exchange resin. The electrolyzed-water generating unit 15C generates hydroxyl ions. Valves 16D to 16F corresponding to the switching unit 16 are provided on the water-purification resin column 14A, the ion-exchange resin column 15A, and the electrolyzed-water generating unit 15C, respectively, on the side of the water tank 11A and the dielectric-fluid tank 12. The dielectric-fluid quality control apparatus 10C also includes an acidic-water storage container 19 that stores acidic water generated by the electrolyzed water. In other words, the dielectric-fluid quality control apparatus 10C according to the fourth embodiment is configured so that the electrolyzed-water generating unit 15C and the acidic-water storage container 19 are added to the configuration according to the second embodiment. As the respective ion exchange resins used in the fourth embodiment, the same as those shown in the second embodiment can be used. In addition, the same constituent elements as those according to the first and the second embodiment are designated with the same reference numerals, and will not be explained herein.

The electrolyzed-water generating unit 15C generates water exhibiting acidity (hereinafter, "acidic water") on an anode in a reaction expressed by the following formula (11), and generates water exhibiting alkalinity (hereinafter, "alkaline water") on a cathode in a reaction expressed by the following formula (12) by electrolyzing water. The alkaline water is used as the dielectric fluid. As the electrolyzed-water generating unit 15C, an alkaline and acidic ionized water generator (manufactured by AQUA SYSTEM Co., Ltd) or an alkaline ion water purifier (manufactured by Matsushita Electric Industrial Co., Ltd.), for example, can be used.

$$2H_2O \rightarrow O_2 + 4H^+ + 4e \quad (11)$$

$$2H_2O + 2e \rightarrow H_2 + 2OH^- \quad (12)$$

The acidic-water storage container 19 stores the acidic water generated on the anode of the electrolyzed-water generating unit 15C. This is because the dielectric-fluid quality control apparatus 10C according to the fourth embodiment does not use the acidic water. The acidic water thus stored is used to be mixed with the alkaline water to neutralize the water when, for example, the dielectric fluid in the dielectric-fluid tank 12 is replaced.

Procedures of the quality control over the dielectric fluid by the dielectric-fluid quality control apparatus will be explained. If the freshwater that is the dielectric fluid stock in the water tank 11A is introduced first into the electrolyzed-water generating unit 15C, the alkaline water is generated on the cathode thereof. Since the alkaline water has a high conductivity, the alkaline water is supplied to the water purification resin to reduce the conductivity of the dielectric fluid down to the predetermined value, thereby providing the ion exchange water as the dielectric fluid.

Thereafter, if the electrical-discharge machining apparatus is activated, the conductivity of the dielectric fluid rises by corrosion products (metal ions such as Cu2+ or Zn2+) generated by the wire electrode 305 or the like and dissolution of carbonate gas (H+ or CO3−) in the air. In this case, the dielectric fluid is supplied to the ion-exchange resin column 15A to thereby substitute Na+ for the metal ions and turn the dielectric fluid into a strong basic fluid, and the resultant dielectric fluid is supplied to the water-purification resin column 14A to maintain the predetermined conductivity (that is correlated with pH). Since the pH control is the same as that explained in the second embodiment, it will not be explained herein in detail.

Figure 13:
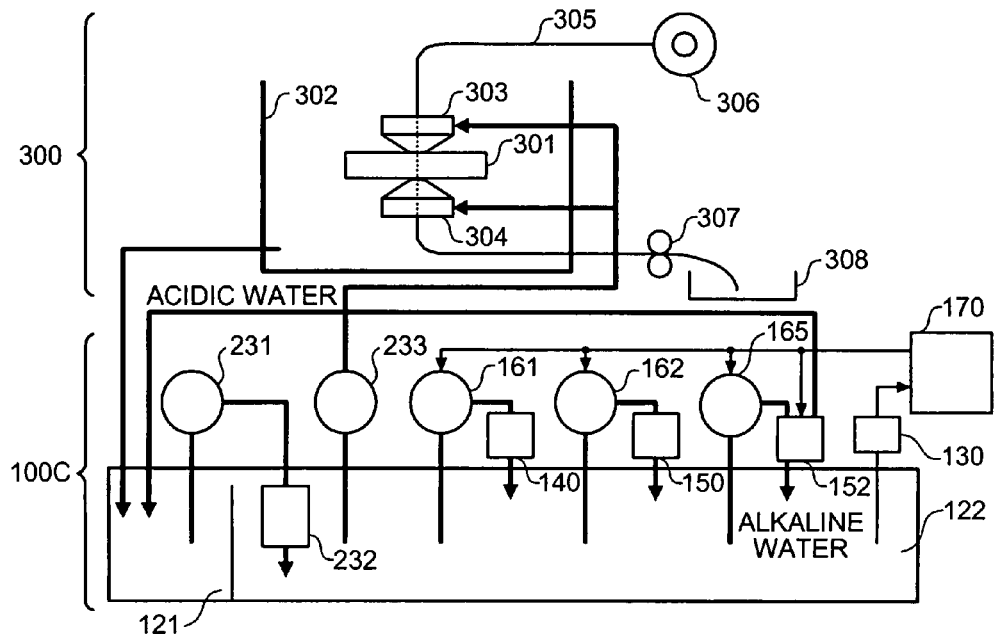
FIG. 13 is a schematic diagram of a configuration example of an electrical-discharge machining apparatus that includes the dielectric-fluid quality control apparatus shown in FIG. 12.

The electrical-discharge machining apparatus that includes the dielectric-fluid quality control apparatus shown in FIG. 12 will be explained. FIG. 13 is a schematic diagram of a configuration example of the electrical-discharge machining apparatus that includes the dielectric-fluid quality control apparatus shown in FIG. 12. The electrical-discharge machining apparatus is configured by the electrical-discharge machining unit 300 that performs an electrical-discharge-machining process on the workpiece 301, and a dielectric-fluid quality control unit 100C that circulates the dielectric fluid used in the electrical-discharge machining unit 300 to clean and recycle the dielectric fluid. The electrical-discharge machining apparatus according to the fourth embodiment is configured so that an electrolyzed-water generating unit 152 and an electrolyzed-water pump 165 are added to the dielectric-fluid quality control unit 100A of the electrical-discharge machining apparatus according to the second embodiment. The electrolyzed-water generating unit 152 generates the alkaline water containing hydroxyl ions that are corrosion protection ions, and supplies the alkaline water to the clean-fluid tank 122. The electrolyzed-water pump 165 pump up the dielectric fluid from the clean-fluid tank 122, and supplies the dielectric fluid to the electrolyzed-water generating unit 152. The other constituent elements of the electrical-discharge machining apparatus according to the fourth embodiment are the same as those according to the second embodiment. Therefore, they are designated with the same reference numerals and will not be explained herein. Furthermore, in the discharge machining apparatus, the acidic water generated by the electrolyzed-water generating unit 152 is stored in the waste-fluid tank 121.

An operation performed by the electrical-discharge machining apparatus shown in FIG. 13 during the electrical-discharge-machining process will be explained. Since the process performed by the electrical-discharge machining unit 300 is the same as that performed by the electrical-discharge machining unit 300 according to the second embodiment, it will not be explained herein. As explained in the second embodiment, the impurity-containing dielectric fluid temporarily stored in the machining tank 302 by the electrical-discharge-machining process is introduced into the waste-fluid tank 121. After the impurity is filtered out, the resultant machining water is stored in the clean-fluid tank 122. The conductivity meter 130 measures the conductivity of the dielectric fluid in the clean-fluid tank 122, and transmits the measurement result to the switching control unit 170.

FIG. 14 depicts a control operation performed by the switching control unit. FIG. 15 is a flowchart of a switching process performed by the switching control unit. To perform stable electrical discharge machining without reducing the corrosion protection effect on the workpiece 301, it is necessary to maintain the conductivity (pH) of the dielectric fluid to the predetermined set value. The switching control unit 170 performs a process therefor. As shown in FIG. 14, if the value measured by the conductivity meter 130 is higher than the set value, the switching control unit 170 activates the water-purification resin pump 161 and stops the corrosion-protection resin pump 162 and the electrolyzed-water pump 165. In addition, the dielectric fluid in the clean-fluid tank 122 is supplied to the water-purification resin column 140 through the piping path. If the value measured by the conductivity meter 130 is lower than the set value during machining time, the switching control unit 170 stops the water-purification resin pump 161 and activates the corrosion-protection resin pump 162 and the electrolyzed-water pump 165. In addition, the dielectric fluid in the clean-fluid tank 122 is supplied to the corrosion-protection resin column 150 and the electrolyzed-water generating unit 152 through the piping path.

Furthermore, if the conductivity of the value measured by the conductivity meter 130 during non-machining time is lower than the set value, the switching control unit 170 stops the water-purification resin pump 161 and the corrosion-protection resin pump 162 and activates the electrolyzed-water pump 165. In addition, the dielectric fluid in the clean-fluid tank 122 is supplied to the electrolyzed-water generating unit 152 through the piping path.

In other words, the switching control unit 170 determines whether the measured conductivity (that is correlated with pH) of the dielectric fluid is higher than the predetermined set value (step S311). If the conductivity (that is correlated with pH) of the dielectric fluid is higher than the predetermined set value ("Yes" at step S311), the switching control unit 170 activates the water-purification resin pump 161 and stops the corrosion-protection resin pump 162 and the electrolyzed-water pump 165 (step S312). The dielectric fluid in the clean-fluid tank 122 is supplied to the water-purification resin column 140 through the piping path. The impurity ions such as metal ions generated by the electrical discharge machining and carbonate ions resulting from carbonate gas in the air are thereby eliminated, and the conductivity (that is correlated with pH) of the dielectric fluid is reduced.

If the conductivity (that is correlated with pH) of the dielectric fluid is lower than the predetermined set value ("No" at step S311), the switching control unit 170 determines whether the machining is being performed on the workpiece 301 (step S313). If the machining is being performed ("Yes" at step S313), the switching control unit 170 stops the water-purification resin pump 161 and activates the corrosion-protection resin pump 162 and the electrolyzed-water pump 165 (step S314). The dielectric fluid in the clean-fluid tank 122 is supplied to the corrosion-protection resin pump 162 and the electrolyzed-water pump 165 through the piping path to maintain the pH and to prevent deterioration of the corrosion protection characteristic of the dielectric fluid. The conductivity (that is correlated with pH) of the dielectric fluid is thereby maintained near the preset value.

If the machining is not being performed ("No" at step S313), the switching control unit 170 stops the water-purification resin pump 161 and the corrosion-protection resin pump 162 and activates the electrolyzed-water pump 165 (step S315). By thus activating the electrolyzed-water pump 165 and supplying the dielectric fluid to the electrolyzed-water generating unit 152 through the piping path, the pH is maintained and the deterioration of the corrosion protection characteristic of is prevented. That is, during the non-machining time, the metal ions are not generated by the electrical discharge machining and the carbonate ions resulting from the dissolution of carbonate gas in the air are dominantly generated. As a result, if the conductivity of the dielectric fluid is lower than the set value, the conductivity (that is correlated with pH) of the dielectric fluid is maintained near the preset value to maintain the pH and to prevent the deterioration of the corrosion protection characteristic of the dielectric fluid.

A process result obtained when the dielectric fluid is controlled by the apparatus configured as explained in the fourth embodiment will be explained. As an initial state of the electrical discharge machining, the running water (conductivity of 147 $\mu$S/cm and pH of 7.2) that is the dielectric fluid stock is supplied to the electrical-discharge machining apparatus. The set value for controlling the conductivity is 14 $\mu$S/cm. A process until the dielectric fluid (conductivity of 14 $\mu$S/cm and pH of 9.5) having the conductivity and the corrosion protection function suited for the electrical discharge machining is generated will be explained first, followed by explanation of a result of machining and immersing the workpiece using the generated dielectric fluid.

The conductivity of the running water that is the machining fluid stock is 147 $\mu$S/cm, which is higher than the set value for controlling the conductivity. Therefore, according to the flowchart shown in FIG. 15, the dielectric fluid in the clean-fluid tank 122 is supplied to the water-purification resin column 140, and the process for eliminating impurity ions is repeatedly performed. As a result, the ion exchange water having the conductivity of 14 $\mu$S/cm and the pH of 6.2 is generated. Thereafter, if the conductivity of the dielectric fluid in the clean-fluid tank 122 is equal to or lower than 14 $\mu$S/cm, the machining fluid is supplied to the electrolyzed-water generating unit 152 since the workpiece 301 is not being machined (the machining is not started yet). In addition, the process for substituting hydroxyl ions for the impurity ions is repeatedly performed until the conductivity of the dielectric fluid is equal to the conductivity corresponding to the pH of 9.5. If the workpiece 301 is being machined, then the dielectric fluid is supplied to the electrolyzed-water generating unit 152 and the corrosion-protection resin column 150, and the process according to the flowchart shown in FIG. 15 is repeatedly executed until the pH is equal to 9.5. At this time, the conductivity of the ion exchange water is 14 $\mu$S/cm, and the conductivity of 14 $\mu$S/cm and the pH of 9.5 are on the line of the relationship between the conductivity and the pH shown in FIG. 3. A good correlation can be held between the conductivity and the pH.

Thereafter, the ion exchange water having the conductivity of 14 $\mu$S/cm and the pH of 9.5 is used as the dielectric fluid, and WC—Co that is the cemented carbide and Cu and Fe that are metals are machined and immersed in the dielectric fluid for four days. As a result, WC—Co, Cu, and Fe are discolored only slightly but hardly corroded.

As a comparison example, the ion exchange water (conductivity of 2.6 $\mu$S/cm and pH of 6.2) which water has been supplied not to the corrosion-protection resin column 150 and the electrolyzed-water generating unit 152 but to the water-purification resin column 140 only, is used as the dielectric fluid. WC—Co, Cu, and Fe are machined and immersed in the dielectric fluid for four days. As a result, WC—Co, Cu, and Fe develop corrosion, which is worse than discoloration.

According to the fourth embodiment, the dielectric fluid is turned into the alkaline aqueous solution and the conductivity of the alkaline aqueous solution is measured by using the conductivity meter 130, the water-purification resin column 140, the corrosion-protection resin column 150, and the electrolyzed-water generating unit 152 under presence of dissolved oxygen. It is thereby advantageously possible to control the conductivity and the pH of the dielectric fluid and protect the cemented carbide (WC—Co) or the metal (Cu, Fe) from corrosion.

INDUSTRIAL APPLICABILITY

As explained so far, the dielectric-fluid quality control apparatus according to the present invention is effective for the electrical-discharge-machining process in the dielectric fluid, in which the storage process after the machining process in the dielectric fluid are performed for a long time.

The invention claimed is:

1. An electrical-discharge-machining apparatus including an apparatus for controlling pH of a dielectric fluid, wherein the apparatus includes
   a dielectric-fluid tank that stores the dielectric fluid;
   a water purifying unit that generates pure water by eliminating impurity ions from the dielectric fluid so that the dielectric fluid contains a predetermined amount of impurity ions consisting of impurity cations and impurity anions;
   a corrosion-protection-ion generating unit that generates corrosion protection ions, substitutes predetermined cations for the impurity cations contained in the dielectric fluid, and substitutes the corrosion protection ions for the impurity anions contained in the dielectric fluid;
   a switching unit that switches a supply of the dielectric fluid stored in the dielectric-fluid tank between the water purifying unit and the corrosion-protection-ion generating unit;
   a conductivity measuring unit that measures a conductivity of the dielectric fluid stored in the dielectric-fluid tank; and
   a switching control unit that controls the switching unit based on the conductivity measured.

2. An apparatus for controlling pH of a dielectric fluid, comprising:
   a dielectric-fluid tank that stores the dielectric fluid;
   a water purifying unit that generates pure water by eliminating impurity ions from the dielectric fluid so that the dielectric fluid contains a predetermined amount of impurity ions consisting of impurity cations and impurity anions;
   a corrosion-protection-ion generating unit that generates corrosion protection ions, substitutes predetermined cations for the impurity cations contained in the dielectric fluid, and substitutes the corrosion protection ions for the impurity anions contained in the dielectric fluid;
   a switching unit that switches a supply of the dielectric fluid stored in the dielectric-fluid tank between the water purifying unit and the corrosion-protection-ion generating unit;
   a conductivity measuring unit that measures a conductivity of the dielectric fluid stored in the dielectric-fluid tank; and
   a switching control unit that controls the switching unit based on the conductivity measured.

3. The apparatus according to claim 2, wherein the switching control unit controls the switching unit to supply the dielectric fluid to the water purifying unit if the conductivity is higher than a predetermined conductivity, and to supply the dielectric fluid to the corrosion-protection-ion generating unit if the conductivity is lower than the predetermined conductivity.

4. The apparatus according to claim 3, wherein the predetermined conductivity is a conductivity corresponding to the pH of the dielectric fluid, and the pH is in a range of 8.5 to 10.5.

5. The apparatus according to claim 3, wherein the predetermined conductivity is lower than or equal to 70 $\mu$S/cm.

6. The apparatus according to claim 2, wherein the corrosion-protection-ion generating unit substitutes cations of an alkaline metal or an alkaline-earth metal for the impurity cations, and substitutes hydroxyl ions for the impurity anions, to generate an alkaline aqueous solution.

7. The apparatus according to claim 2, wherein the water purifying unit includes an $H^+$-form-cation-exchange resin and an $OH^-$-form-anion-exchange resin, and the corrosion-protection-ion generating unit includes a cation-exchange resin that contains ions of an alkaline metal or an alkaline-earth metal in ion exchange groups, and the $OH^-$-form-anion-exchange resin.

8. The apparatus according to claim 2, wherein the corrosion-protection-ion generating unit further generates alkaline water that contains hydroxyl ions obtained by electrolyzing the dielectric fluid.

9. The apparatus according to claim 2, wherein each of the water purifying unit and the corrosion-protection-ion generating unit includes
   an $H^+$-form-cation-exchange resin column that includes an $H^+$-form-cation-exchange resin;
   an $OH^-$-form-anion-exchange resin column that includes an $OH^-$-form-anion-exchange resin; and
   a cation-exchange resin column that includes a cation-exchange resin that contains ions of alkaline metal or alkaline-earth metal in ion exchange groups.

10. A method for controlling pH of a dielectric fluid stored in a dielectric-fluid tank, the method comprising:
    eliminating an impurity from the dielectric fluid so that the dielectric fluid contains a predetermined amount of impurity ions consisting of impurity cations and impurity anions;
    substituting corrosion protection ions for the impurity anions contained in the dielectric fluid; and
    controlling an amount of the corrosion protection ions in the dielectric fluid based on a conductivity of the dielectric fluid.

11. The method according to claim 10, wherein the corrosion protection ions are hydroxyl ions.

12. The method according to claim 11, wherein the hydroxyl ions are generated by electrolyzing the dielectric fluid.

13. The method according to claim 10, wherein the substituting includes
    substituting cations of an alkaline metal or an alkaline-earth metal for the impurity cations contained in the dielectric fluid; and
    substituting hydroxyl ions for the impurity anions contained in the dielectric fluid, to generate an alkaline aqueous solution.

14. The method according to claim 10, wherein the controlling includes
    eliminating the impurity anions if the conductivity is higher than a predetermined conductivity; and
    substituting the corrosion protection ions for the impurity anions if the conductivity is lower than the predetermined conductivity.

* * * * *